US012603279B2

(12) United States Patent
Endoh et al.

(10) Patent No.: US 12,603,279 B2
(45) Date of Patent: Apr. 14, 2026

(54) POSITIVE ELECTRODE ACTIVE MATERIAL FOR SECONDARY BATTERY, POSITIVE ELECTRODE FOR SECONDARY BATTERY, AND SECONDARY BATTERY

(71) Applicant: MURATA MANUFACTURING CO., LTD., Kyoto (JP)

(72) Inventors: Kazuaki Endoh, Kyoto (JP); Hironobu Kubota, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 846 days.

(21) Appl. No.: 17/875,978

(22) Filed: Jul. 28, 2022

(65) Prior Publication Data

US 2022/0384793 A1 Dec. 1, 2022

Related U.S. Application Data

(63) Continuation of application No. PCT/JP2020/046511, filed on Dec. 14, 2020.

(30) Foreign Application Priority Data

Jan. 31, 2020 (JP) ................................ 2020-015696

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/505* (2013.01); *H01M 4/525* (2013.01);
(Continued)

(58) Field of Classification Search
CPC ...... H01M 4/366; H01M 4/505; H01M 4/525; H01M 10/0525; H01M 2004/021
See application file for complete search history.

(56) References Cited

U.S. PATENT DOCUMENTS

2004/0241520 A1* 12/2004 Ha ...................... H01M 8/1039 429/535
2012/0196183 A1 8/2012 Chiga et al.
(Continued)

FOREIGN PATENT DOCUMENTS

CN 107710466 A 2/2018
CN 113831786 A * 12/2021 ............... C09D 1/00
(Continued)

OTHER PUBLICATIONS

Chinese Office Action issued Sep. 27, 2023 in corresponding Chinese Application No. 202080091213.3.
(Continued)

*Primary Examiner* — Nicholas A Smith
*Assistant Examiner* — Benjamin Eli Kass-Mullet
(74) *Attorney, Agent, or Firm* — K&L Gates LLP

(57) ABSTRACT

A secondary battery includes a positive electrode for a secondary battery, a negative electrode, and an electrolytic solution. The positive electrode for a secondary battery includes a positive electrode active material for a secondary battery. The positive electrode active material for a secondary battery includes first particles and second particles. The first particles have a median diameter D50 of greater than or equal to 15 micrometers and less than or equal to 30 micrometers and each include a lithium-containing compound. The second particles have a median diameter D50 of greater than or equal to 1 micrometer and less than or equal to 10 micrometers and each include a center part that includes a lithium-containing compound and a covering part provided on a surface of the center part. The covering part includes, in order from a side closer to the center part, an underlayer and a surface layer. The underlayer includes a reaction product of a first metal alkoxide in which no alkyl group is bonded to a metal atom. The surface layer includes
(Continued)

a reaction product of a second metal alkoxide in which the alkyl group is bonded to the metal atom. The reaction product of the second metal alkoxide is bonded to the reaction product of the first metal alkoxide.

8 Claims, 4 Drawing Sheets

(51) Int. Cl.
*H01M 4/505* (2010.01)
*H01M 4/525* (2010.01)
*H01M 10/0525* (2010.01)

(52) U.S. Cl.
CPC .. *H01M 10/0525* (2013.01); *H01M 2004/021* (2013.01); *H01M 2004/028* (2013.01)

(56) References Cited

U.S. PATENT DOCUMENTS

2012/0196185 A1 8/2012 Kono et al.
2016/0301063 A1 10/2016 Yukinobu et al.
2018/0145317 A1 5/2018 Momma et al.
2018/0287156 A1* 10/2018 Yu .............................. C09C 1/36
2019/0044134 A1* 2/2019 Liu ...................... H01M 4/1395
2020/0235381 A1* 7/2020 Park ...................... H01M 4/131

FOREIGN PATENT DOCUMENTS

JP 2011034776 A 2/2011
JP 2011049161 A 3/2011
JP 2011113783 A 6/2011
JP 2012169249 A * 9/2012 .............. H01M 4/62
JP 2012199101 A 10/2012
JP 2013191539 A 9/2013
JP 2018088400 A 6/2018
JP 2018120705 A * 8/2018 .......... H01M 10/052
JP 2020161213 A 10/2020
KR 101452699 B1 * 10/2014 .............. H01M 4/13
WO 2015072359 A1 5/2015

OTHER PUBLICATIONS

European Search Report for corresponding EP Application No. 20917128, dated Apr. 14, 2025. (9 pages).
International Search Report of corresponding PCT application PCT/JP2020/046511, dated Feb. 16, 2021.

* cited by examiner

POSITIVE ELECTRODE ACTIVE MATERIAL FOR SECONDARY BATTERY, POSITIVE ELECTRODE FOR SECONDARY BATTERY, AND SECONDARY BATTERY

CROSS REFERENCE TO RELATED APPLICATIONS

The present application is a continuation of PCT patent application No. PCT/JP2020/046511, filed on Dec. 14, 2020, which claims priority to Japanese patent application no. JP2020-015696, filed on Jan. 31, 2020, the entire contents of which are incorporated herein by reference.

BACKGROUND

The present application relates to a positive electrode active material for a secondary battery, a positive electrode for a secondary battery, and a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode (a positive electrode for a secondary battery), a negative electrode, and an electrolytic solution. The positive electrode includes a positive electrode active material (a positive electrode active material for a secondary battery).

A configuration of a secondary battery influences a battery characteristic. Accordingly, the configuration of the secondary battery has been considered in various ways.

Specifically, in order to obtain a positive electrode active material having a superior coating property, the following are used: large-sized positive electrode active material particles each including a polyanion-based compound and carbon; and a carbon composite material of small-sized positive electrode active material particles each including a polyanion-based compound and carbon. In order to provide a covering layer with a uniform thickness, used is lithium-transition-metal composite oxide powder covered with a covering layer having a Si and transition metal surface composition rate of 80% or higher. In order to suppress gas generation upon continuous charging in a high temperature environment, used is a positive electrode active material having a layer that is surface-treated using a silane coupling agent, i.e., a surface-treated layer. In order to obtain superior electric conductivity, used is a positive electrode active material including particles that each include a polyanion-based compound and carbon and are each covered with a lipophilic treatment agent. In order to suppress swelling of a secondary battery, used is a positive electrode active material obtained from: particles each including a positive electrode material into which a lithium ion is insertable and from which a lithium ion is extractable; a silane coupling agent bondable to the positive electrode material; and a polymer compound bondable to the silane coupling agent.

SUMMARY

The present application relates to a positive electrode active material for a secondary battery, a positive electrode for a secondary battery, and a secondary battery.

Although consideration has been given in various ways to improve a battery characteristic of a secondary battery, the secondary battery has not yet achieved a sufficient cyclability characteristic or a sufficient load characteristic, and there is still room for improvement in terms thereof.

The present technology has been made in view of such an issue and it is an object of the present technology, according to an embodiment, to provide a positive electrode active material for a secondary battery, a positive electrode for a secondary battery, and a secondary battery that each make it possible to achieve a superior cyclability characteristic and a superior load characteristic.

A positive electrode active material for a secondary battery according to an embodiment of the present technology includes first particles and second particles. The first particles have a median diameter D50 of greater than or equal to 15 micrometers and less than or equal to 30 micrometers and each include a lithium-containing compound. The second particles have a median diameter D50 of greater than or equal to 1 micrometer and less than or equal to 10 micrometers and each include a center part that includes a lithium-containing compound and a covering part provided on a surface of the center part. The covering part includes an underlayer and a surface layer in order from a side closer to the center part. The underlayer includes a reaction product of a first metal alkoxide in which no alkyl group is bonded to a metal atom. The surface layer includes a reaction product of a second metal alkoxide in which an alkyl group is bonded to a metal atom. The reaction product of the second metal alkoxide is bonded to the reaction product of the first metal alkoxide.

A positive electrode for a secondary battery according to an embodiment of the present technology includes a positive electrode active material layer including a positive electrode active material for a secondary battery. The positive electrode active material for a secondary battery has a configuration similar to that of the above-described positive electrode active material for a secondary battery according to the embodiment of the present technology.

A secondary battery according to an embodiment of the present technology includes a positive electrode for a secondary battery, a negative electrode, and an electrolytic solution. The positive electrode for a secondary battery has a configuration similar to that of the above-described positive electrode for a secondary battery according to the embodiment of the present technology.

According to the positive electrode active material for a secondary battery, the positive electrode for a secondary battery, or the secondary battery of the embodiment of the present technology, the positive electrode active material for a secondary battery includes the first particles having the median diameter D50 within a range from 15 μm to 30 μm both inclusive and the second particles having the median diameter within a range from 1 μm to 10 μm both inclusive. The covering part of each of the second particles includes the underlayer including the reaction product of the first metal alkoxide and the surface layer including the reaction product of the second metal alkoxide. This makes it possible to achieve a superior cyclability characteristic and a superior load characteristic.

Note that effects of the present technology are not necessarily limited to those described herein and may include any suitable effects including described below in relation to the present technology.

DETAILED DESCRIPTION

One or more embodiments of the present technology are described below in further detail with reference to the drawings.

A description is given first of a positive electrode active material for a secondary battery according to an embodiment of the present technology.

The positive electrode active material for a secondary battery described herein is a material into which an electrode reactant is insertable and from which the electrode reactant is extractable, and is to be used in a secondary battery. Hereinafter, the positive electrode active material for a secondary battery is simply referred to as a "positive electrode active material". Details of a secondary battery using the positive electrode active material will be described later.

Although not particularly limited in kind, the electrode reactant is a light metal, such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. That is, the positive electrode active material described below is a material into which lithium is insertable and from which lithium is extractable. In the positive electrode active material, lithium is inserted and extracted in an ionic state.

Figure 1:
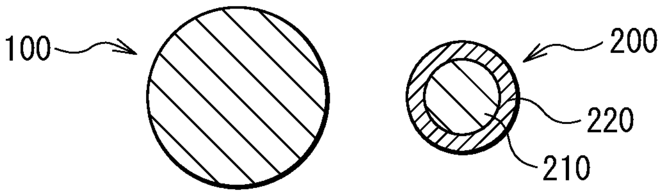
FIG. 1 is a schematic sectional view of a configuration of a positive electrode active material for a secondary battery according to an embodiment of the present technology.
Figure 2:
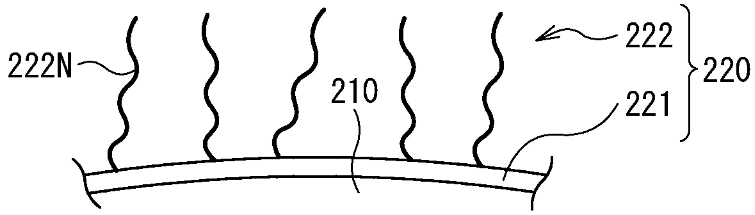
FIG. 2 is a diagram schematically illustrating a configuration in the vicinity of a surface of a small-sized particle illustrated in FIG. 1.
Figure 3:
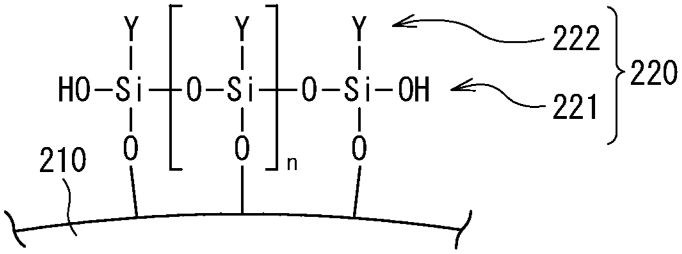
FIG. 3 is another diagram schematically illustrating the configuration in the vicinity of the surface of the small-sized particle illustrated in FIG. 1.

FIG. 1 schematically illustrates a sectional configuration of the positive electrode active material. FIGS. 2 and 3 each schematically illustrate a configuration in the vicinity of a surface of a small-sized particle 200 illustrated in FIG. 1. Note that FIG. 2 illustrates a configuration of a covering part 220 with line drawing whereas FIG. 3 illustrates the configuration of the covering part 220 using a chemical formula together with the line drawing.

The positive electrode active material has a form of particles (positive electrode active material particles). As illustrated in FIG. 1, the positive electrode active material particles include two kinds of particles that are different from each other in average particle size, more specifically, in median diameter D50 (μm), i.e., large-sized particles 100 and small-sized particles 200. Note that FIG. 1 illustrates only one of the large-sized particles 100 and only one of the small-sized particles 200.

The wording "the positive electrode active material particles include two kinds of particles that are different from each other in average particle size" means that measurement of a particle size distribution (particle diameter distribution) of the positive electrode active material particles results in detection of two peaks attributed to the two kinds of particles described above.

The large-sized particles 100 are first particles having a relatively large median diameter D50. More specifically, the large-sized particles 100 have a median diameter D50 that is greater than a median diameter D50 of the small-sized particles 200.

As illustrated in FIG. 1, unlike the small-sized particles 200, the large-sized particles 100 each do not include a component corresponding to the covering part 220 which will be described later. Specifically, the median diameter D50 of the large-sized particles 100 is within a range from 15 μm to 30 μm both inclusive. A reason for this is that this makes appropriate the median diameter D50 of the large-sized particles 100 in relation to the median diameter D50 of the small-sized particles 200 and therefore makes it easier for gaps between the large-sized particles 100 to be filled with the small-sized particles 200.

The large-sized particles 100 each include one or more of lithium-containing compounds. The term "lithium-containing compound" is a generic term for a compound that includes lithium as a constituent element. The lithium-containing compound is not limited to a particular kind. Here, the lithium-containing compound is a compound that includes lithium and a transition metal element as constituent elements, i.e., a lithium-transition-metal compound. The transition metal element may be one or more in number of kinds. Note that the lithium-transition-metal compound may include any one or more elements other than lithium and the one or more transition metal elements. The lithium-transition-metal compound is not limited to a particular kind. Specific examples of the lithium-transition-metal compound include an oxide, a phosphoric acid compound, a silicic acid compound, and a boric acid compound.

Among them, the lithium-containing compound (the lithium-transition-metal compound) preferably includes one or more of a compound represented by Formula (1), a compound represented by Formula (2), or a compound represented by Formula (3). A reason for this is that a high energy density is thereby obtainable. Note that although a composition of lithium in each of Formulae (1) to (3) differs depending on a charge and discharge state, the value of "a" is a value in a completely discharged state.

$$Li_aNi_{(1-b-c)}Mn_bM1_cO_{(2-d)}X_e \quad (1)$$

where:

M1 is at least one of elements belonging to groups 2 to 15 in a long period periodic table of elements other than Ni and Mn;

X is at least one of elements belonging to groups 16 and 17 in the long period periodic table of elements other than O; and a, b, c, d, and e satisfy $0 \le a \le 1.5$, $0 \le b \le 1$, $0 \le c \le 1$, $-0.1 \le d \le 0.2$, and $0 \le e \le 0.2$.

$$Li_aCo_{(1-b)}M2_bO_{(2-c)} \quad (2)$$

where:

M2 is at least one of V, Cu, Zr, Zn, Mg, Al, Ga, Y, or Fe; and a, b, and c satisfy $0.9 \le a \le 1.1$, $0 \le b \le 0.3$, and $-0.1 \le c \le 0.1$.

$$Li_aNi_bCo_cMn_dM3_{(1-b-c-d)}O_{(2-e)} \quad (3)$$

where:

M3 is at least one of V, Cu, Zr, Zn, Mg, Al, Ga, Y, or Fe; and a, b, c, d, and e satisfy $-0.1 \le a \le 0.1$, $0.9 \le b \le 1.1$, $0 < c < 1$, $0 < d < 1$, $0 < e < 0.5$, and $0 \le 1-b-c-d$.

The compound represented by Formula (1) is a lithium composite oxide including nickel as a major transition metal element, i.e., a nickel-based lithium composite oxide. Specific examples of the nickel-based lithium composite oxide include, without particular limitation, $LiNiO_2$, $LiNi_{0.5}Co_{0.2}Mn_{0.3}O_2$, and $LiNi_{0.8}Co_{0.5}Al_{0.05}O_2$.

The compound represented by Formula (2) is a lithium composite oxide including cobalt as a major transition metal element, i.e., a cobalt-based lithium composite oxide. Specific examples of the cobalt-based lithium composite oxide include, without particular limitation, $LiCoO_2$ and $LiCo_{0.98}Al_{0.01}Mg_{0.01}O_2$.

The compound represented by Formula (3) is a lithium composite oxide including nickel, cobalt, and manganese as major transition metal elements, i.e., a ternary lithium composite oxide. Specific examples of the ternary lithium composite oxide include, without particular limitation, $LiNi_{0.5}Co_{0.2}Mn_{0.3}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

The small-sized particles 200 are second particles having a relatively small median diameter D50. More specifically, the small-sized particles 200 have the median diameter D50 that is smaller than the median diameter D50 of the large-sized particles 100.

Specifically, the median diameter D50 of the small-sized particles 200 is within a range from 1 μm to 10 μm both inclusive. A reason for this is that this makes appropriate the median diameter D50 of the small-sized particles 200 in relation to the median diameter D50 of the large-sized particles 100 and therefore makes it easier for the gaps between the large-sized particles 100 to be filled with the small-sized particles 200.

As illustrated in FIG. 1, the small-sized particles 200 each include a center part 210 and the covering part 220, and are therefore covered particles in each of which a surface of the center part 210 is covered with the covering part 220.

The center part 210 includes a lithium-containing compound. Details of the lithium-containing compound are as described above. Note that the lithium-containing compound included in the center part 210 and the lithium-containing compound included in the large-sized particles 100 may be the same as each other in kind or different from each other in kind.

The covering part 220 is provided on the surface of the center part 210 and therefore covers the surface of the center part 210. Note that the covering part 220 may cover the entire surface of the center part 210 or may cover only a portion of the surface of the center part 210. In the latter case in which the covering part 220 covers only a portion of the surface of the center part 210, two or more covering parts 220 may cover the surface of the center part 210 at two or more respective locations separated away from each other.

As illustrated in FIGS. 2 and 3, the covering part 220 includes an underlayer 221 and a surface layer 222. The underlayer 221 and the surface layer 222 are disposed in order from a side closer to the center part 210. In other words, the covering part 220 has a two-layer structure in which the underlayer 221 and the surface layer 222 are stacked in order from the side closer to the center part 210.

The covering part 220 described herein includes the underlayer 221 and the surface layer 222, and is therefore an organic-inorganic hybrid film including a reaction product of a first metal alkoxide and a reaction product of a second metal alkoxide, as will be described later.

The underlayer 221 includes one or more of reaction products of the first metal alkoxide. The first metal alkoxide is a compound in which an alkoxy group is bonded to a metal atom. More specifically, unlike the second metal alkoxide described later, the first metal alkoxide is a compound in which the alkoxy group is bonded to the metal atom and no alkyl group is bonded to the metal atom.

A reason why the covering part 220 includes the underlayer 221 (the reaction product of the first metal alkoxide) is that the underlayer 221 secures ionic conductivity of the small-sized particles 200. In this case, as will be described later, because the reaction product of the first metal alkoxide has fine pores 221K, lithium ions move more easily via the fine pores 221K (see Formula (41)).

The metal atom is not limited to a particular kind as long as it is able to form a metal alkoxide. Specifically, the metal atom is one of a silicon atom, a titanium atom, an aluminum atom, or a zirconium atom. Among them, the silicon atom is preferable. A reason for this is that it becomes easier for the reaction product of the first metal alkoxide having the fine pores 221K described above to be formed easily and stably.

Specifically, the first metal alkoxide includes one or more of compounds represented by Formula (4). Note that in a case where the first metal alkoxide includes a plurality of R11s, the R11s may be the same as each other in kind or different from each other in kind. It goes without saying that only some of the R11s may be of the same kind.

$$M11\text{-}OR11_a \quad (4)$$

where:

M11 is a metal atom;

R11 is an alkyl group having carbon number of greater than or equal to 1 and less than or equal to 10; and "a" is a value determined in accordance with a valence of M11.

Details of the metal atom (M11) are as described above. That is, the metal atom is one of a silicon atom, a titanium atom, an aluminum atom, or a zirconium atom, and is preferably, among them, a silicon atom.

The alkyl group (R11) is a monovalent group including carbon and hydrogen. The alkyl group (R11) may have a straight-chain structure or a branched structure having one or more side chains. The alkyl group has the carbon number within a range from 1 to 10 both inclusive; therefore, specific examples of the alkyl group include a methyl group, an ethyl group, a propyl group, and a butyl group.

Note that the alkyl group having carbon number of 3 or greater may have a straight-chain structure or a branched structure, as described above. Specifically, for example, a propyl group having carbon number of 3 may be an n-propyl group or an isopropyl group. For example, a butyl group having carbon number of 4 may be an n-butyl group, a sec-butyl group, an isobutyl group, or a tert-butyl group.

The value of "a" is the same as a value of a valence of the metal atom. More specifically, in a case where the metal atom is the silicon atom or the like described above, the value of "a" is 3 or 4.

Specific examples of the first metal alkoxide in a case where the metal atom is a silicon atom include, without particular limitation, Si—$(OCH_3)_4$, Si—$(OC_2H_5)_4$, Si—$(OC_3H_7)_4$, and Si—$(OC_4H_9)_4$.

Specific examples of the first metal alkoxide in a case where the metal atom is a titanium atom include, without particular limitation, Ti—$(OCH_3)_4$, Ti—$(OC_2H_5)_4$, Ti—$(OC_3H_7)_4$, and Ti—$(OC_4H_9)_4$.

Specific examples of the first metal alkoxide in a case where the metal atom is an aluminum atom include, without particular limitation, Al—$(OCH_3)_3$, Al—$(OC_2H_5)_3$, Al—$(OC_3H_7)_3$, and Al—$(OC_4H_9)_3$.

Specific examples of the first metal alkoxide in a case where the metal atom is a zirconium atom include, without particular limitation, Zr—$(OCH_3)_4$, Zr—$(OC_2H_5)_4$, Zr—$(OC_3H_7)_4$, and Zr—$(OC_4H_9)_4$.

The reaction product of the first metal alkoxide is not limited to a particular configuration. Here, for example, in a case where the metal atom is a silicon atom, and more specifically, the first metal alkoxide is Si—$(OC_2H_5)_4$, the reaction product of the first metal alkoxide has a configuration represented by Formula (41).

[Chem. 1]

Chem. 1

41

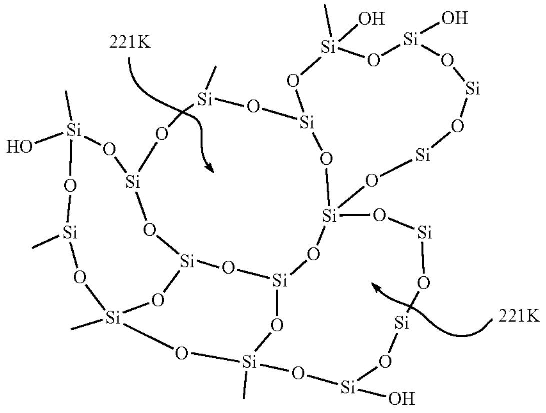

In the reaction product of the first metal alkoxide represented by Formula (41), every two silicon atoms are bonded to each other via an oxygen atom. The reaction product of the first metal alkoxide thus includes a plurality of silicon atom-oxygen atom bonds. Accordingly, the reaction product of the first metal alkoxide has a meshed structure mainly including silicon atoms and oxygen atoms.

As can be seen from Formula (41), in the reaction product of the first metal alkoxide, silicon atoms and oxygen atoms are alternately bonded to form a plurality of rings, and each of the rings thus has a space (a fine pore 221K) therein. Accordingly, the reaction product of the first metal alkoxide has a plurality of fine pores 221K.

Thus, as illustrated in FIGS. 2 and 3, the underlayer 221 is a layer based on the above-described meshed structure (the silicon atoms and the oxygen atoms), more specifically, a film-shaped layer covering the surface of the center part 210.

Although a specific configuration is not described here, it goes without saying that in the case where the metal atom is a titanium atom also, the reaction product of the first metal alkoxide likewise has a meshed structure including a plurality of titanium atom-oxygen atom bonds, and thus has a plurality of fine pores 221K.

In the case where the metal atom is an aluminum atom also, the reaction product of the first metal alkoxide likewise has a meshed structure including a plurality of aluminum atom-oxygen atom bonds, and thus has a plurality of fine pores 221K.

In the case where the metal atom is a zirconium atom also, the reaction product of the first metal alkoxide likewise has a meshed structure including a plurality of zirconium atom-oxygen atom bonds, and thus has a plurality of fine pores 221K.

Although not particularly limited, a content of the underlayer 221 (the reaction product of the first metal alkoxide) in the covering part 220, i.e., a rate (wt %) of a weight of the reaction product of the first metal alkoxide with respect to a weight of the covering part 220, is preferably within a range from 2 wt % to 95 wt % both inclusive in particular. A reason for this is that it becomes easier for the above-described meshed structure to be formed by the reaction product of the first metal alkoxide.

Note that the underlayer 221 preferably further includes one or more of reaction products of a third metal alkoxide. The third metal alkoxide is a compound in which two metal atoms are bonded to each other via an alkylene group. More specifically, unlike the first metal alkoxide described above, the third metal alkoxide is a compound in which the alkylene group is interposed between the two metal atoms.

In a case where the underlayer 221 further includes the reaction product of the third metal alkoxide, ionic conductivity of the small-sized particles 200 further improves. In this case, as will be described later, in the reaction product of the third metal alkoxide having fine pores 221K, a pore size of the fine pores 221K increases, which makes it further easier for the lithium ions to move via the fine pores 221K (see Formula (51)).

Specifically, the third metal alkoxide is a compound represented by Formula (6). Note that M13 and M14 may be the same as each other in kind or different from each other in kind. This similarly applies to kinds of R15 and R16. In addition, in a case where the third metal alkoxide includes a plurality of R15s, the R15s may be the same as each other in kind or different from each other in kind. It goes without saying that only some of the R15s may be the same as each other in kind. This similarly applies to the kinds of R16s in a case where the third metal alkoxide includes a plurality of R16s.

$$(R15O)_c\text{-M13-R14-M14-}(OR16)_d \qquad (6)$$

where:

M13 and M14 are each a metal atom;

R14 is an alkylene group having carbon number of greater than or equal to 1 and less than or equal to 10;

R15 and R16 are each an alkyl group having carbon number of greater than or equal to 1 and less than or equal to 10;

c is a value determined in accordance with a valence of M13; and d is a value determined in accordance with a valence of M14.

Details of each of the metal atoms (M13 and M14) and the alkyl groups (R15 and R16) are as described above. The value of "c" corresponds to a value obtained by subtracting 1 from the value of the valence of the metal atom (M13). More specifically, in a case where the metal atom is the silicon atom or the like described above, the value of "c" is 2 or 3. The value of "d" corresponds to a value obtained by subtracting 1 from the value of the valence of the metal atom (M14). More specifically, in a case where the metal atom is the silicon atom or the like described above, the value of "d" is 2 or 3.

The alkylene group (R14) is a divalent group including carbon and hydrogen. The alkylene group (R14) may have a straight-chain structure or a branched structure having one or more side chains. The alkylene group has the carbon number within a range from 1 to 10 both inclusive; therefore, specific examples of the alkylene group include an ethylene group, a butylene group, and a hexene group.

Specific examples of the third metal alkoxide in a case where the metal atom is a silicon atom include, without particular limitation, $(H_3CO)_3$—Si—$C_2H_4$—Si—$(OCH_3)_3$, $(H_3CO)_3$—Si—$C_4H_8$—Si—$(OCH_3)_3$, and $(H_3CO)_3$—Si—$C_6H_{12}$—Si—$(OCH_3)_3$.

Specific examples of the third metal alkoxide in a case where the metal atom is a titanium atom include, without particular limitation, $(H_3CO)_3$—Ti—$C_2H_4$—Ti—$(OCH_3)_3$, $(H_3CO)_3$—Ti—$C_4H_8$—Ti—$(OCH_3)_3$, and $(H_3CO)_3$—Ti—$C_6H_{12}$—Ti—$(OCH_3)_3$.

Specific examples of the third metal alkoxide in a case where the metal atom is an aluminum atom include, without particular limitation, $(H_3CO)_2$—Al—$C_2H_4$—Al—$(OCH_3)_2$, $(H_3CO)_2$—Al—$C_4H_8$—Al—$(OCH_3)_2$, and $(H_3CO)_2$—Al—$C_6H_{12}$—Al—$(OCH_3)_2$.

Specific examples of the third metal alkoxide in a case where the metal atom is a zirconium atom include, without particular limitation, $(H_3CO)_3$—Zr—$C_2H_4$—Zr—$(OCH_3)_3$, $(H_3CO)_3$—Zr—$C_4H_8$—Zr—$(OCH_3)_3$, and $(H_3CO)_3$—Zr—$C_6H_{12}$—Zr—$(OCH_3)_3$.

The reaction product of the third metal alkoxide is not limited to a particular configuration. Here, for example, in a case where the metal atom is a silicon atom, and more specifically, the third metal alkoxide is $(H_3CO)_3$—Si—$C_2H_4$—Si—$(OCH_3)_3$, the reaction product of the third metal alkoxide has a configuration represented by Formula (51).

[Chem. 2]

Chem. 2

51

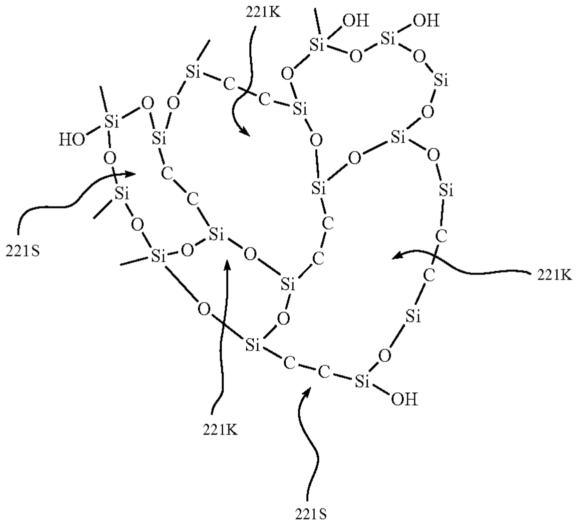

The reaction product of the third metal alkoxide represented by Formula (51) has a configuration similar to that of the reaction product of the first metal alkoxide represented by Formula (41), except that some of silicon atoms are bonded to each other via an alkylene group. That is, in the reaction product of the third metal alkoxide, silicon atoms are bonded to each other via an oxygen atom. The reaction product of the third metal alkoxide thus includes a plurality of silicon atom-oxygen atom bonds. In addition, in the reaction product of the third metal alkoxide, silicon atoms are bonded to each other via an alkylene group (a carbon atom). The reaction product of the third metal alkoxide thus includes a plurality of silicon atom-carbon atom bonds. Accordingly, the reaction product of the third metal alkoxide has a meshed structure and therefore has fine pores 221K.

As compared with the reaction product of the first metal alkoxide, the reaction product of the third metal alkoxide is greater in the size of the fine pores 221K due to presence of a spacer 221S (an alkylene group) interposed between two silicon atoms. Accordingly, it is further easier for the lithium ions to move via the fine pores 221K in the reaction product of the third metal alkoxide.

Although a specific configuration is not described here, it goes without saying that in a case where the metal atom is a titanium atom also, the reaction product of the third metal alkoxide likewise has a meshed structure including a plurality of titanium atom-oxygen atom bonds and a plurality of titanium atom-carbon atom bonds. Therefore, the reaction product of the third metal alkoxide has fine pores 221K and the size of the fine pores 221K is increased by the spacer 221S.

In a case where the metal atom is an aluminum atom also, the reaction product of the third metal alkoxide likewise has a meshed structure including a plurality of aluminum atom-oxygen atom bonds and a plurality of aluminum atom-carbon atom bonds. Therefore, the reaction product of the third metal alkoxide has fine pores 221K and the size of the fine pores 221K is increased by the spacer 221S.

In a case where the metal atom is a zirconium atom also, the reaction product of the third metal alkoxide likewise has a meshed structure including a plurality of zirconium atom-oxygen atom bonds and a plurality of zirconium atom-carbon atom bonds. Therefore, the reaction product of the third metal alkoxide has fine pores 221K and the size of the fine pores 221K is increased by the spacer 221S.

Although not particularly limited, a content of the underlayer 221 (the reaction product of the third metal alkoxide) in the covering part 220, i.e., a rate (wt %) of a weight of the reaction product of the third metal alkoxide with respect to the weight of the covering part 220, is preferably within a range from 2 wt % to 90 wt % both inclusive in particular. A reason for this is that the fine pores 221K having a sufficiently large size are formed more easily by the reaction product of the third metal alkoxide.

The surface layer 222 includes one or more of reaction products of the second metal alkoxide. The second metal alkoxide is a compound in which an alkoxy group is bonded to a metal atom. More specifically, unlike the first metal alkoxide described above, the second metal alkoxide is a compound in which the alkoxy group is bonded to the metal atom and an alkyl group is also bonded to the metal atom. The reaction product of the second metal alkoxide is bonded to the reaction product of the first metal alkoxide; therefore, the surface layer 222 is coupled to the underlayer 221.

A reason why the covering part 220 includes the surface layer 222 (the reaction product of the second metal alkoxide) is that the surface layer 222 secures a filling characteristic of the small-sized particles 200. In this case, as will be described later, the reaction product of the second metal alkoxide has a plurality of hydrocarbon chains 222N, which decreases surface free energy of the surface layer 222. This improves a slip property of the surface of each of the small-sized particles 200, which makes it easier for the gaps between the large-sized particles 100 to be filled with the small-sized particles 200 (see FIG. 2).

Specifically, the second metal alkoxide is a compound represented by Formula (5). Note that in a case where the second metal alkoxide includes a plurality of R13s, the R13s may be the same as each other in kind or different from each other in kind. It goes without saying that only some of the R13s may be of the same kind.

$$R12\text{-}M12\text{-}OR13_b \qquad (5)$$

where:

M12 is a metal atom;

R12 is an alkyl group having carbon number of greater than or equal to 8 and less than or equal to 30;

R13 is an alkyl group having carbon number of greater than or equal to 1 and less than or equal to 10; and b is a value determined in accordance with a valence of M12.

Details of each of the metal atom (M12) and the alkyl groups (R12 and R13) are as described above. The alkyl group (R12) has the carbon number within a range from 8 to 30 both inclusive; therefore, specific examples of the alkyl group (R12) include an octyl group, a decyl group, a hexadecyl group, an eicosyl group, and a triacontyl group. The value of "b" corresponds to a value obtained by subtracting 1 from the value of the valence of the metal atom. More specifically, in a case where the metal atom is the silicon atom or the like described above, the value of "b" is 2 or 3.

Here, for example, in a case where M12 is a silicon atom, specific examples of the second metal alkoxide include, without particular limitation, $H_{17}C_8$—Si—$(OCH_3)_3$, $H_{21}C_{10}$—Si—$(OCH_3)_3$, $H_{33}C_{16}$—Si—$(OCH_3)_3$, $H_{41}C_{20}$—Si—$(OCH_3)_3$, and $H_{61}C_{30}$Si—$(OCH_3)_3$.

The reaction product of the second metal alkoxide is not limited to a particular configuration. Here, for example, in a case where the second metal alkoxide is $H_{33}C_{16}$Si—$(OC_3H_7)_3$, the reaction product of the second metal alkoxide has a configuration illustrated in FIGS. 2 and 3.

As illustrated in FIGS. 2 and 3, one end of the reaction product of the second metal alkoxide is bonded to the reaction product of the first metal alkoxide having the meshed structure included in the underlayer 221, and another end of the reaction product of the second metal alkoxide, i.e., —$C_{16}H_{33}$ which is the hydrocarbon chains 222N, extends radially in a direction away from the underlayer 221. The hydrocarbon chains 222N are arranged being separated from each other with a distance therebetween. Note that "Y" in FIG. 3 represents a portion of the reaction product of the second metal alkoxide.

Thus, as illustrated in FIGS. 2 and 3, the surface layer 222 is a layer based on the above-described hydrocarbon chains 222N, more specifically, a whisker-shaped layer extending radially from the center part 210.

Although not particularly limited, a content of the surface layer 222 (the reaction product of the second metal alkoxide) in the covering part 220, i.e., a rate (wt %) of a weight of the reaction product of the second metal alkoxide with respect to the weight of the covering part 220, is preferably within a range from 5 wt % to 90 wt % both inclusive. A reason for this is that it becomes easier for the hydrocarbon chains 222N to be arranged stably in the reaction product of the second metal alkoxide.

A mixture ratio between the large-sized particles 100 and the small-sized particles 200 is not particularly limited. A rate (wt %) of a weight of the small-sized particles 200 with respect to the sum total of a weight of the large-sized particles 100 and the weight of the small-sized particles 200 is preferably within a range from 1 wt % to 30 wt % both inclusive in particular. Such a rate makes it easier for the gaps between the large-sized particles 100 to be filled with the small-sized particles 200.

The above-described rate is calculated by the following equation: rate (wt %)=[weight of small-sized particles 200/(weight of large-sized particles 100+weight of small-sized particles 200)]×100.

Upon an electrode reaction, lithium is inserted into and extracted from the positive electrode active material (the large-sized particles 100 and the small-sized particles 200). In this case, lithium is inserted and extracted in an ionic state.

In a case of manufacturing the positive electrode active material, first, the large-sized particles 100 (a lithium-containing compound in a powder form) and the center parts 210 (a lithium-containing compound in a powder form) are prepared.

Thereafter, the covering part 220 is formed on the surface of each of the center parts 210 by an immersion method to thereby manufacture the small-sized particles 200.

Specifically, first, the center parts 210, the first metal alkoxide, and the second metal alkoxide are put into an alkaline solvent, following which the solvent is stirred. The alkaline solvent includes one or more of materials including, without limitation, a mixture of ethanol and ammonia water. Thus, the center parts 210 are dispersed in the alkaline solvent, and the first metal alkoxide and the second metal alkoxide are each dissolved in the alkaline solvent. As a result, a preparation solution is prepared. In the preparation solution, the center parts 210 are dispersed in the solution in which the first metal alkoxide and the second metal alkoxide are each dissolved; therefore, the solution adheres to the surface of each of the center parts 210.

In this case, the third metal alkoxide may be further put into the alkaline solvent. As a result, a preparation solution in which the third metal alkoxide is further dissolved in the alkaline solvent is prepared.

Thereafter, the center parts 210 are filtered from the preparation solution, following which the center parts 210 are washed using a solvent for washing. The solvent for washing includes one or more of organic solvents including, without limitation, acetone.

Lastly, the center parts 210 are heated to be dried. The first metal alkoxide and the second metal alkoxide each thus react on the surface of each of the center parts 210. Accordingly, the base layer 221 is formed by the reaction product of the first metal alkoxide, and the surface layer 222 is formed by the reaction product of the second metal alkoxide. In this case, the reaction product of the first metal alkoxide and the reaction product of the second metal alkoxide are bonded to each other; therefore, the surface layer 222 is coupled to the underlayer 221. The covering part 220 including the underlayer 221 and the surface layer 222 is thus formed on the surface of each of the center parts 210. As a result, the small-sized particles 200 are obtained.

In a case of using the preparation solution in which the third metal alkoxide is further dissolved in the alkaline solvent, the underlayer 221 is formed by the reaction product of the first metal alkoxide and the reaction product of the third metal alkoxide.

After the small-sized particles 200 are obtained by the above-described procedure, the large-sized particles 100 and the small-sized particles 200 are mixed with each other. As a result, the positive electrode active material including the large-sized particles 100 and the small-sized particles 200 is manufactured.

Note that although the immersion method is used here to manufacture the small-sized particles 200, one or more of methods other than the immersion method may be used to manufacture the small-sized particles 200. Examples of such other methods include a coating method and a spraying method. In a case of using the coating method, the preparation solution is applied to the surface of each of the center parts 210. In a case of using the spraying method, the preparation solution is sprayed onto the surface of each of the center parts 210.

According to the positive electrode active material, included are the large-sized particles 100 having the median diameter D50 within a range from 15 μm to 30 μm both inclusive and the small-sized particles 200 having the median diameter D50 within a range from 1 μm to 10 μm both inclusive. The covering part 220 of each of the small-sized particles 200 (each including the center part 210 and the covering part 220) includes the underlayer 221 including the reaction product of the first metal alkoxide and the surface layer 222 including the reaction product of the second metal alkoxide.

In this case, as described above, the ionic conductivity of the small-sized particles 200 is secured in the underlayer 221 including the reaction product of the first metal alkoxide, and the filling characteristic of the small-sized particles 200 is secured in the surface layer 222 including the reaction product of the second metal alkoxide.

More in detail, because the surface layer 222 includes the reaction product of the second metal alkoxide (the hydrocarbon chains 222N), the surface free energy of the surface layer 222 decreases, which improves the slip property of the surface of each of the small-sized particles 200. This makes it easier for the small-sized particles 200 to get into the gaps provided between the large-sized particles 100, making it easier for the gaps to be filled with the small-sized particles 200. As a result, a filling characteristic of the positive electrode active material (the large-sized particles 100 and the small-sized particles 200) improves, and a high energy density is therefore obtained.

However, such improvement in the filling characteristic of the positive electrode active material makes it difficult for the lithium ions to move via the covering part 220, especially via the underlayer 221 interposed between the center part 210 and the surface layer 222. Therefore, ionic conductivity for the lithium ions decreases. Accordingly, the positive electrode active material increases in electric resistance due to the decrease in the ionic conductivity.

In this case, if the underlayer 221 includes the reaction product of the first metal alkoxide having the fine pores 221K, the lithium ions are able to move more easily via the fine pores 221K, resulting in improvement of the ionic conductivity for the lithium ions. Accordingly, the positive electrode active material decreases in electric resistance due to the improvement of the ionic conductivity.

Based upon the above, in a case where the covering part 220 of each of the small-sized particles 200 includes the underlayer 221 including the reaction product of the first metal alkoxide and the surface layer 222 including the reaction product of the second metal alkoxide, the small-sized particles 200 improve in the filling characteristic while the ionic conductivity of the small-sized particles 200 is secured. This makes easier the insertion and the extraction of the lithium ions while a high energy density is obtained. Accordingly, the small-sized particles 200 improve in both the filling characteristic and the ionic conductivity. As a result, it is possible to obtain a superior cyclability characteristic and a superior load characteristic of the secondary battery using the positive electrode active material.

In particular, the metal atom may include a silicon atom or the like. This makes it easier for the reaction product of the first metal alkoxide (the meshed structure) having the fine pores 221K to be formed easily and stably. Accordingly, it is possible to achieve higher effects. In this case, the metal atom may include a silicon atom. This makes it further easier for the meshed structure to be formed easily and stably, making it possible to achieve even higher effects.

Moreover, the first metal alkoxide may include the compound represented by Formula (4). This makes it easier for the reaction product of the first metal alkoxide to be formed easily and stably, making it possible to achieve higher effects. In addition, the second metal alkoxide may include the compound represented by Formula (5). This makes it easier for the reaction product of the second metal alkoxide to be formed easily and stably, making it possible to achieve higher effects.

Moreover, the lithium-containing compound may include one or more of the compound represented by Formula (1), the compound represented by Formula (2), or the compound represented by Formula (3). This makes it possible to achieve a high energy density, making it possible to achieve higher effects.

Moreover, the underlayer 221 may further include the reaction product of the third metal alkoxide. This further improves the ionic conductivity of the small-sized particles 200, making it possible to achieve higher effects. In this case, the third metal alkoxide may include the compound represented by Formula (6). This makes it easier for the reaction product of the third metal alkoxide to be formed easily and stably, making it possible to achieve even higher effects.

Next, described is a secondary battery according to an embodiment of the present technology using the above-described positive electrode active material.

A positive electrode for a secondary battery according to an embodiment of the present technology is a portion or a configuration element of the secondary battery described here, and is therefore described together below. Hereinafter, the positive electrode for a secondary battery is simply referred to as a "positive electrode".

The following description refers to the case where the electrode reactant is lithium as an example, as described above. A secondary battery that obtains a battery capacity using insertion and extraction of lithium is a so-called lithium-ion secondary battery.

Figure 4:
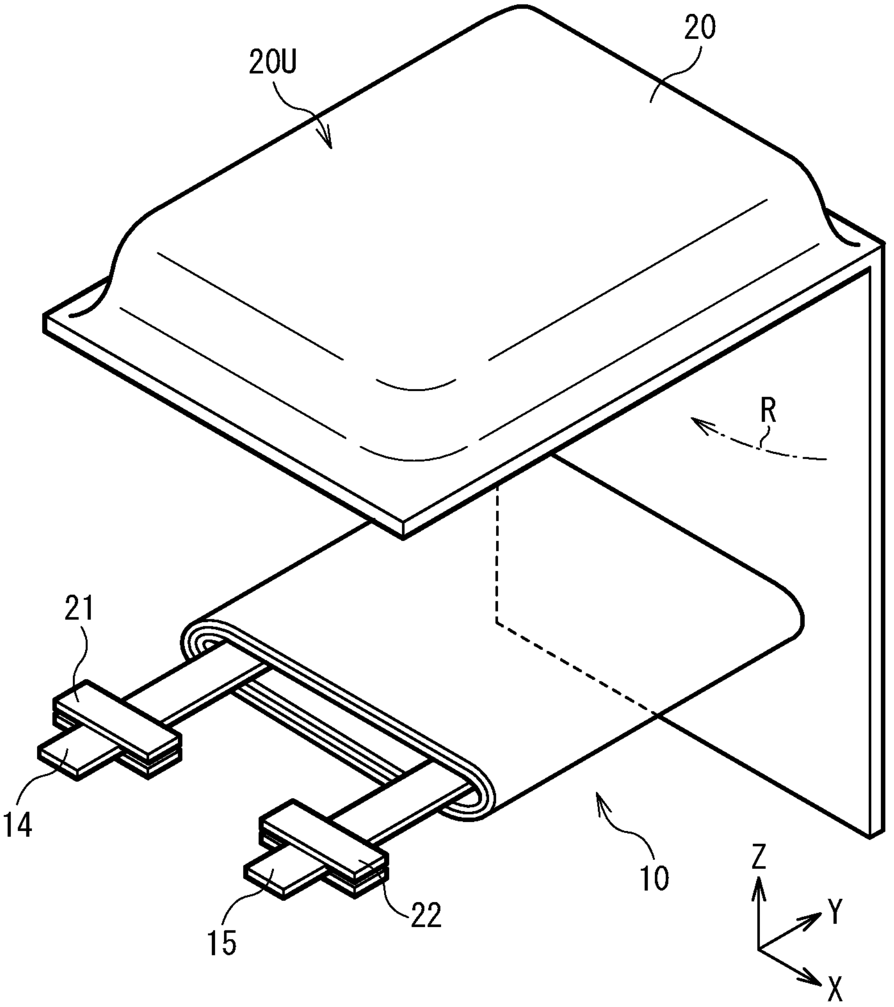
FIG. 4 is a perspective view of a configuration of a secondary battery (a positive electrode for a secondary battery) according to an embodiment of the present technology.
Figure 5:
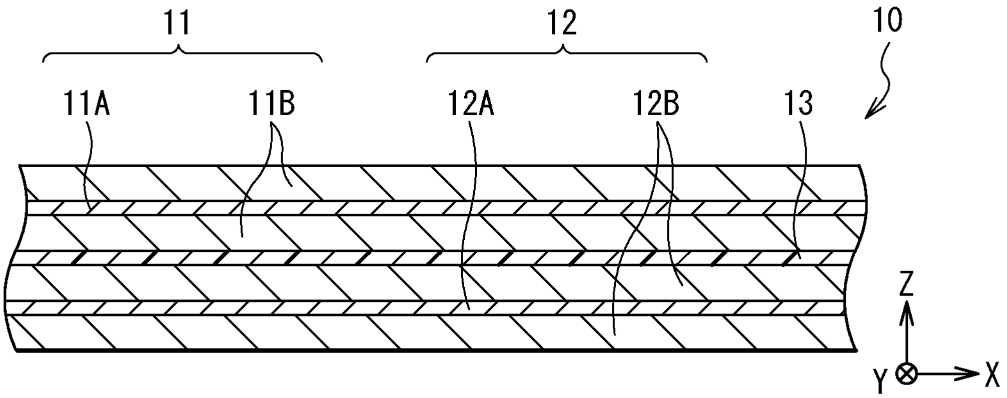
FIG. 5 is a sectional view of a configuration of a battery device illustrated in FIG. 4.

FIG. 4 illustrates a perspective configuration of the secondary battery. FIG. 5 illustrates a sectional configuration of a battery device 10 illustrated in FIG. 4. Note that FIG. 4 illustrates a state in which the battery device 10 and an outer package film 20 are separated from each other, and FIG. 5 illustrates a section of a portion of the battery device 10. In the following, reference will be made where appropriate to FIGS. 1 to 3 which have already been described.

As illustrated in FIG. 4, the secondary battery includes the battery device 10, the outer package film 20, a positive electrode lead 14, and a negative electrode lead 15. The battery device 10 is contained inside the outer package film 20. The positive electrode lead 14 and the negative electrode lead 15 are led out in respective directions that are common to each other, from inside to outside the outer package film 20.

The secondary battery described here is a secondary battery of a laminated-film type in which an outer package member having flexibility or softness, i.e., the outer package film 20, is used as an outer package member to contain the battery device 10 therein.

As illustrated in FIG. 4, the outer package film 20 is a single film-shaped member and is foldable in a direction of an arrow R (an arrowed dash-dotted line). The outer package film 20 contains the battery device 10 as described above, and therefore contains a positive electrode 11, a negative electrode 12, and an electrolytic solution. The outer package film 20 has a depression part 20U to place the battery device 10 therein. The depression part 20U is a so-called deep drawn part.

Specifically, the outer package film 20 is a three-layered laminated film including a fusion-bonding layer, a metal layer, and a surface protective layer that are stacked in this order from an inner side. In a state in which the outer package film 20 is folded, mutually opposed outer edges of the fusion-bonding layer are fusion-bonded to each other. The fusion-bonding layer includes a polymer compound such as polypropylene. The metal layer includes a metal material such as aluminum. The surface protective layer includes a polymer compound such as nylon.

Note that the outer package film 20 is not particularly limited in configuration or in the number of layers, and may therefore include one layer, two layers, or four or more layers.

A sealing film 21 is interposed between the outer package film 20 and the positive electrode lead 14. A sealing film 22 is interposed between the outer package film 20 and the negative electrode lead 15. The sealing films 21 and 22 are each a member that prevents unintentional entry of outside air into the outer package film 20, and include one or more of polymer compounds having adherence to the positive electrode lead 14 and the negative electrode lead 15, respectively. Examples of such a polymer compound include polyolefin. Examples of the polyolefin include polyethylene, polypropylene, modified polyethylene, and modified polypropylene. Note that one or both of the sealing films 21 and 22 may be omitted.

As illustrated in FIGS. 4 and 5, the battery device 10 includes the positive electrode 11, the negative electrode 12, a separator 13, and the electrolytic solution (not illustrated) which is a liquid electrolyte. The positive electrode 11, the negative electrode 12, and the separator 13 are each impregnated with the electrolytic solution.

Here, the battery device 10 is a structure in which the positive electrode 11 and the negative electrode 12 are wound with the separator 13 interposed therebetween, and is a so-called wound electrode body. More specifically, in the battery device 10 which is the wound electrode body, the positive electrode 11 and the negative electrode 12 are stacked on each other with the separator 13 interposed therebetween, and the stack of the positive electrode 11, the negative electrode 12, and the separator 13 is wound about a winding axis (a virtual axis extending in a Y-axis direction). In other words, the positive electrode 11 and the negative electrode 12 are wound together with the separator 13 while being opposed to each other with the separator 13 interposed therebetween.

A section of the battery device 10 intersecting the winding axis, that is, a section of the battery device 10 along an XZ plane, has an elongated shape defined by a major axis and a minor axis, and more specifically, has an elongated, generally elliptical shape. The major axis is an axis (a horizontal axis) that extends in an X-axis direction and has a relatively large length. The minor axis is an axis (a vertical axis) that extends in a Y-axis direction intersecting the X-axis direction and has a relatively small length.

As illustrated in FIG. 5, the positive electrode 11 includes a positive electrode active material layer 11B. More specifically, the positive electrode 11 includes a positive electrode current collector 11A, and two positive electrode active material layers 11B provided on respective opposite sides of the positive electrode current collector 11A. Note that the positive electrode active material layer 11B may be provided only on one of the opposite sides of the positive electrode current collector 11A.

The positive electrode current collector 11A includes one or more of electrically conductive materials including, without limitation, a metal material. Examples of the metal material include aluminum, nickel, and stainless steel. The positive electrode active material layer 11B includes one or more of positive electrode active materials into which lithium is insertable and from which lithium is extractable. Note that the positive electrode active material layer 11B may further include, for example, a positive electrode binder and a positive electrode conductor.

Details of the positive electrode active material are as described above. That is, the positive electrode active material includes the large-sized particles 100 and the small-sized particles 200, and each of the small-sized particles 200 includes the center part 210 and the covering part 220.

The positive electrode binder includes one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride, polyimide, and carboxymethyl cellulose.

The positive electrode conductor includes one or more of electrically conductive materials including, without limitation, a carbon material. Examples of the carbon material include graphite, carbon black, acetylene black, and Ketjen black. The electrically conductive material may be a metal material or a polymer compound, for example.

As illustrated in FIG. 5, the negative electrode 12 includes a negative electrode current collector 12A, and two negative electrode active material layers 12B provided on respective opposite sides of the negative electrode current collector 12A. Note that the negative electrode active material layer 12B may be provided only on one of the opposite sides of the negative electrode current collector 12A.

The negative electrode current collector 12A includes one or more of electrically conductive materials including, without limitation, a metal material. Examples of the metal material include copper, aluminum, nickel, and stainless steel. The negative electrode active material layer 12B includes one or more of negative electrode active materials into which lithium is insertable and from which lithium is extractable. Note that the negative electrode active material layer 12B may further include, for example, a negative electrode binder and a negative electrode conductor. Details of the negative electrode binder are similar to those of the positive electrode binder. Details of the negative electrode conductor are similar to those of the positive electrode conductor.

The negative electrode active material is not particularly limited in kind, and specific examples thereof include a carbon material and a metal-based material. Examples of the carbon material include graphitizable carbon, non-graphitizable carbon, and graphite. Examples of the graphite include natural graphite and artificial graphite. The metal-based material is a material that includes one or more elements among metal elements and metalloid elements that are each able to form an alloy with lithium. Examples of such metal elements and metalloid elements include silicon and tin. The metal-based material may be a simple substance, an alloy, a compound, a mixture of two or more thereof, or a material including two or more phases thereof.

Specific examples of the metal-based material include $SiB_4$, $SiB_6$, $Mg_2Si$, $Ni_2S_1$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq 2$), LiSiO, $SnO_w$ ($0<w\leq 2$), $SnSiO_3$, LiSnO, and $Mg_2Sn$. Note that "v" of $SiO_v$ may satisfy $0.2<v<1.4$.

A method of forming the negative electrode active material layer 12B is not particularly limited, and specifically, one or more methods are selected from among a coating method, a vapor-phase method, a liquid-phase method, a thermal spraying method, a firing (sintering) method, and other methods.

As illustrated in FIG. 5, the separator 13 is interposed between the positive electrode 11 and the negative electrode 12. The separator 13 is an insulating porous film that allows lithium ions to pass therethrough while preventing a short-circuit caused by a contact between the positive electrode 11 and the negative electrode 12. The porous film includes one or more of polymer compounds including, without limitation, polytetrafluoroethylene, polypropylene, and polyethylene.

The electrolytic solution includes a solvent and an electrolyte salt.

The solvent includes one or more of non-aqueous solvents (organic solvents). An electrolytic solution including a non-aqueous solvent is a so-called non-aqueous electrolytic solution. Examples of the non-aqueous solvent include esters and ethers. More specific examples of the non-aqueous solvent include a carbonic-acid-ester-based compound, a carboxylic-acid-ester-based compound, and a lactone-based compound.

Examples of the carbonic-acid-ester-based compound include a cyclic carbonic acid ester and a chain carbonic acid ester. Examples of the cyclic carbonic acid ester include ethylene carbonate and propylene carbonate. Examples of the chain carbonic acid ester include dimethyl carbonate, diethyl carbonate, and methyl ethyl carbonate. Examples of the carboxylic-acid-ester-based compound include ethyl acetate, ethyl propionate, and ethyl trimethyl acetate. Examples of the lactone-based compound include γ-butyrolactone and γ-valerolactone. Examples of the ethers other than the lactone-based compounds described above include 1,2-dimethoxyethane, tetrahydrofuran, 1,3-dioxolane, and 1,4-dioxane.

Further, examples of the non-aqueous solvent include an unsaturated cyclic carbonic acid ester, a halogenated carbonic acid ester, a sulfonic acid ester, a phosphoric acid ester, an acid anhydride, a nitrile compound, and an isocyanate compound. A reason for this is that chemical stability of the electrolytic solution improves.

Specific examples of the unsaturated cyclic carbonic acid ester include vinylene carbonate, vinylethylene carbonate, and methylene ethylene carbonate. Examples of the halogenated carbonic acid ester include monofluoroethylene carbonate and difluoroethylene carbonate. Examples of the sulfonic acid ester include 1,3-propane sultone and 1,3-propene sultone. Examples of the phosphoric acid ester include trimethyl phosphate.

Examples of the acid anhydride include a cyclic carboxylic acid anhydride, a cyclic disulfonic acid anhydride, and a cyclic carboxylic acid sulfonic acid anhydride. Examples of the cyclic carboxylic acid anhydride include a succinic acid anhydride, a glutaric acid anhydride, and a maleic acid anhydride. Examples of the cyclic disulfonic acid anhydride include an ethane disulfonic acid anhydride and a propane disulfonic acid anhydride. Examples of the cyclic carboxylic acid sulfonic acid anhydride include a sulfobenzoic acid anhydride, a sulfopropionic acid anhydride, and a sulfobutyric acid anhydride.

Examples of the nitrile compound include acetonitrile, acrylonitrile, malononitrile, succinonitrile, glutaronitrile, adiponitrile, sebaconitrile, and phthalonitrile. Examples of the isocyanate compound include hexamethylene diisocyanate.

The electrolyte salt includes one or more of light metal salts including, without limitation, a lithium salt. Examples of the lithium salt include lithium hexafluorophosphate ($LiPF_6$), lithium tetrafluoroborate ($LiBF_4$), lithium trifluoromethanesulfonate ($LiCF_3SO_3$), lithium bis(fluorosulfonyl)imide ($LiN(FSO_2)_2$), lithium bis(trifluoromethanesulfonyl)imide ($LiN(CF_3SO_2)_2$), lithium tris(trifluoromethanesulfonyl)methide ($LiC(CF_3SO_2)_3$), and lithium bis(oxalato)borate ($LiB(C_2O_4)_2$).

Although not particularly limited, a content of the electrolyte salt is specifically within a range from 0.3 mol/kg to 3.0 mol/kg both inclusive with respect to the solvent. A reason for this is that a high ionic conductivity is obtainable.

The positive electrode lead 14 is a positive electrode terminal coupled to the positive electrode 11, and includes one or more of electrically conductive materials including, without limitation, aluminum. The negative electrode lead 15 is a negative electrode terminal coupled to the negative electrode 12, and includes one or more of electrically conductive materials including, without limitation, copper, nickel, and stainless steel. The positive electrode lead 14 and the negative electrode lead 15 each have a shape such as a thin plate shape or a meshed shape.

The number of the positive electrode leads 14 is not particularly limited, and may thus be one, or two or more. In this case, if the number of the positive electrode leads 14 is two or more, in particular, the secondary battery decreases in electrical resistance. This similarly applies to the number of the negative electrode lead 15.

Upon charging the secondary battery, lithium is extracted from the positive electrode 11, and the extracted lithium is inserted into the negative electrode 12 via the electrolytic solution. Upon discharging the secondary battery, lithium is extracted from the negative electrode 12, and the extracted lithium is inserted into the positive electrode 11 via the electrolytic solution. Upon charging and discharging, lithium is inserted and extracted in an ionic state.

In a case of manufacturing the secondary battery, by a procedure described below, the positive electrode 11 and the negative electrode 12 are fabricated, following which the secondary battery is fabricated using the fabricated positive electrode 11 and the fabricated negative electrode 12. In the following, reference will be made where appropriate to FIGS. 1 to 5 which have been already described.

First, the positive electrode active material (the large-sized particles 100 and the small-sized particles 200) is mixed with materials including, without limitation, the positive electrode binder and the positive electrode conductor on an as-needed basis to thereby obtain a positive electrode mixture. Thereafter, the positive electrode mixture is put into a solvent such as an organic solvent to thereby prepare a paste positive electrode mixture slurry. Lastly, the positive electrode mixture slurry is applied on opposite sides of the positive electrode current collector 11A to thereby form the positive electrode active material layers 11B. Thereafter, the positive electrode active material layers 11B may be compression-molded by means of a roll pressing machine. In this case, the positive electrode active material layers 11B may be heated. The positive electrode active material layers 11B may be compression-molded multiple times.

The negative electrode active material layers 12B are formed on respective opposite sides of the negative electrode current collector 12A by a procedure similar to the fabrication procedure of the positive electrode 11 described above. Specifically, the negative electrode active material is mixed with materials including, without limitation, the negative electrode binder and the negative electrode conductor to thereby obtain a negative electrode mixture. Thereafter, the negative electrode mixture is put into a solvent such as an organic solvent to thereby prepare a paste negative electrode mixture slurry. Thereafter, the negative electrode mixture slurry is applied on the opposite sides of the negative electrode current collector 12A to thereby form the negative electrode active material layers 12B. Thereafter, the negative electrode active material layers 12B may be compression-molded.

First, the positive electrode lead 14 is coupled to the positive electrode 11 by a method such as a welding method, and the negative electrode lead 15 is coupled to the negative electrode 12 by a method such as a welding method. In this case, a portion of the positive electrode current collector 11A may be exposed in advance, and the positive electrode lead 14 may be coupled to the exposed portion of the positive electrode current collector 11A; whereas a portion of the negative electrode current collector 12A may be exposed in advance and the negative electrode lead 15 may be coupled to the exposed portion of the negative electrode current collector 12A. Thereafter, the positive electrode 11 and the negative electrode 12 are stacked on each other with the separator 13 interposed therebetween, following which the stack of the positive electrode 11, the negative electrode 12, and the separator 13 is wound to thereby fabricate a wound body. The wound body has a configuration similar to that of the battery device 10 except that the positive electrode 11, the negative electrode 12, and the separator 13 are each not impregnated with the electrolytic solution.

Thereafter, the wound body is placed inside the depression part 20U, following which the outer package film 20 is folded in the direction of the arrow R. Thereafter, outer edges of two sides of the outer package film 20 (the fusion-bonding layer) are bonded to each other by a method such as a thermal-fusion-bonding method to thereby contain the wound body in the pouch-shaped outer package film 20.

Lastly, the electrolytic solution in which the electrolyte salt is added to the solvent is injected into the pouch-shaped outer package film 20, following which the outer edges of the remaining one side of the outer package film 20 (the fusion-bonding layer) are bonded to each other by a method such as a thermal-fusion-bonding method. In this case, the sealing film 21 is interposed between the outer package film 20 and the positive electrode lead 14, and the sealing film 22 is interposed between the outer package film 20 and the negative electrode lead 15. The wound body is thereby impregnated with the electrolytic solution. Thus, the battery device 10 is fabricated. In this manner, the battery device 10 is sealed in the pouch-shaped outer package film 20. As a result, the secondary battery is assembled.

The assembled secondary battery is charged and discharged. Various conditions including, without limitation, an environment temperature, the number of times of charging and discharging (i.e., the number of cycles), and the charging and discharging conditions may be freely set. A film is thereby formed on a surface, for example, of the negative electrode 12. This allows the secondary battery to be in an electrochemically stable state. As a result, the secondary battery using the outer package film 20, i.e., the secondary battery of the laminated-film type is completed.

According to the secondary battery, the positive electrode active material layer 11B of the positive electrode 11 includes the positive electrode active material, and the positive electrode active material has the above-described configuration (the large-sized particles 100 and the small-sized particles 200). Accordingly, for the reasons described above, improvement of the filling characteristic of the positive electrode active material and improvement of the ionic conductivity thereof are both achieved. As a result, it is possible to obtain a superior cyclability characteristic and a superior load characteristic.

Moreover, according to the positive electrode 11, the positive electrode active material layer 11B including the positive electrode active material is provided, and the positive electrode active material has the above-described configuration (the large-sized particles 100 and the small-sized particles 200). Accordingly, it is possible to obtain a superior cyclability characteristic and a superior load characteristic of the secondary battery including the positive electrode 11.

Action and effects of each of the secondary battery and the positive electrode 11 other than the above are similar to those of the positive electrode active material described above.

Next, a description is given of modifications of the above-described secondary battery according to an embodiment. The configuration of the secondary battery is appropriately modifiable as described below. Note that any two or more of the following series of modifications may be combined.

The separator 13 which is a porous film is used. However, although not specifically illustrated here, a separator of a stacked type including a polymer compound layer may be used instead of the separator 13 which is the porous film.

Specifically, the separator of the stacked type includes the above-described porous film, and a polymer compound layer provided on one of or each of opposite sides of the porous film. A reason for this is that adherence of the separator to each of the positive electrode 11 and the negative electrode 12 improves to suppress the occurrence of misalignment of the battery device 10. This helps to prevent the secondary battery from easily swelling even if, for example, a decomposition reaction of the electrolytic solution occurs. The polymer compound layer includes a polymer compound such as polyvinylidene difluoride. A reason for this is that such a polymer compound has superior physical strength and is electrochemically stable.

Note that the porous film, the polymer compound layer, or both may each include one or more kinds of particles including, for example, inorganic particles and resin particles. A reason for this is that such particles dissipate heat upon heat generation by the secondary battery, thus improving heat resistance and safety of the secondary battery. The inorganic particles are not particularly limited in kind, and examples thereof include particles of aluminum oxide (alumina), aluminum nitride, boehmite, silicon oxide (silica), titanium oxide (titania), magnesium oxide (magnesia), and zirconium oxide (zirconia).

In a case of fabricating the separator of the stacked type, a precursor solution including, without limitation, the polymer compound and an organic solvent is prepared and thereafter the precursor solution is applied on one of or each of the opposite sides of the base layer.

Similar effects are obtainable also in the case where the separator of the stacked type is used, as lithium ions are movable between the positive electrode 11 and the negative electrode 12.

The electrolytic solution which is a liquid electrolyte is used. However, although not specifically illustrated here, an electrolyte layer which is a gel electrolyte may be used instead of the electrolytic solution.

In the battery device 10 including the electrolyte layer, the positive electrode 11 and the negative electrode 12 are stacked on each other with the separator 13 and the electrolyte layer interposed therebetween, and the stack of the positive electrode 11, the negative electrode 12, the separator 13, and the electrolyte layer is wound. The electrolyte layer is interposed between the positive electrode 11 and the separator 13, and between the negative electrode 12 and the separator 13.

Specifically, the electrolyte layer includes a polymer compound together with the electrolytic solution. The electrolytic solution is held by the polymer compound in the electrolyte layer. The configuration of the electrolytic solution is as described above. The polymer compound includes, for example, polyvinylidene difluoride. In a case of forming the electrolyte layer, a precursor solution including, without limitation, the electrolytic solution, the polymer compound, and an organic solvent is prepared and thereafter the precursor solution is applied on one of or each of opposite sides of each of the positive electrode 11 and the negative electrode 12.

Similar effects are obtainable also in the case where the electrolyte layer is used, as lithium ions are movable between the positive electrode 11 and the negative electrode 12 via the electrolyte layer.

Next, a description is given of applications (application examples) of the above-described secondary battery according to an embodiment.

The applications of the secondary battery are not particularly limited as long as they are, for example, machines, equipment, instruments, apparatuses, or systems (an assembly of a plurality of pieces of equipment, for example) in which the secondary battery is usable mainly as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic equipment including portable electronic equipment; portable life appliances; apparatuses for data storage; electric power tools; battery packs to be mounted as detachable power sources on, for example, laptop personal computers; medical electronic equipment; electric vehicles; and electric power storage systems. Examples of the electronic equipment include video cameras, digital still cameras, mobile phones, laptop personal computers, cordless phones, headphone stereos, portable radios, portable televisions, and portable information terminals. Examples of the portable life appliances include electric shavers. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems for accumulation of electric power for a situation such as emergency. Note that the secondary battery may have a battery structure of the above-described laminated-film type, a cylindrical type, or any other type. Further, multiple secondary batteries may be used, for example, as a battery pack or a battery module.

In particular, the battery pack and the battery module are each effectively applied to relatively large-sized equipment, etc., including an electric vehicle, an electric power storage system, and an electric power tool. The battery pack, as will be described later, may include a single battery, or may include an assembled battery. The electric vehicle is a vehicle that operates (travels) using the secondary battery as a driving power source, and may be an automobile that is additionally provided with a driving source other than the secondary battery as described above, such as a hybrid automobile. The electric power storage system is a system that uses the secondary battery as an electric power storage source. An electric power storage system for home use accumulates electric power in the secondary battery which is an electric power storage source, and the accumulated electric power may thus be utilized for using, for example, home appliances.

Some application examples of the secondary battery will now be described in detail according to an embodiment. The configurations of the application examples described below are merely examples, and are appropriately modifiable. The secondary battery to be used in the following application examples is not limited to a particular kind, and may therefore be of a laminated-film type or of a cylindrical type.

Figure 6:
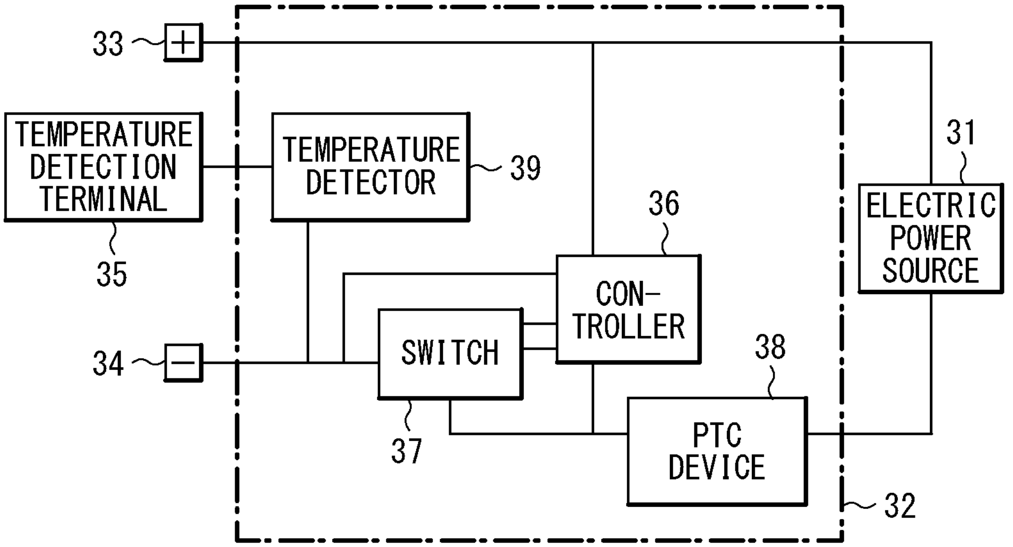
FIG. 6 is a block diagram illustrating a configuration of an application example of the secondary battery, which is a battery pack including a single battery according to an embodiment.

FIG. 6 illustrates a block configuration of a battery pack. The battery pack described here is a simple battery pack (a so-called soft pack) including one secondary battery, and is to be mounted on, for example, electronic equipment typified by a smartphone.

As illustrated in FIG. 6, the battery pack includes an electric power source 31 and a circuit board 32. The circuit board 32 is coupled to the electric power source 31, and includes a positive electrode terminal 33, a negative electrode terminal 34, and a temperature detection terminal 35. The temperature detection terminal 35 is a so-called T terminal.

The electric power source 31 includes one secondary battery. The secondary battery has a positive electrode lead coupled to the positive electrode terminal 33 and a negative electrode lead coupled to the negative electrode terminal 34. The electric power source 31 is couplable to outside via the positive electrode terminal 33 and the negative electrode terminal 34, and is thus chargeable and dischargeable via the positive electrode terminal 33 and the negative electrode terminal 34. The circuit board 32 includes a controller 36, a switch 37, a thermosensitive resistive device (a positive temperature coefficient (PTC) device) 38, and a temperature detector 39. However, the PTC device 38 may be omitted.

The controller 36 includes, for example, a central processing unit (CPU) and a memory, and controls an overall operation of the battery pack. The controller 36 detects and controls a use state of the electric power source 31 on an as-needed basis.

If a battery voltage of the electric power source 31 (the secondary battery) reaches an overcharge detection voltage or an overdischarge detection voltage, the controller 36 turns off the switch 37. This prevents a charging current from flowing into a current path of the electric power source 31. In addition, if a large current flows upon charging or discharging, the controller 36 turns off the switch 37 to block the charging current. The overcharge detection voltage and the overdischarge detection voltage are not particularly limited. For example, the overcharge detection voltage is 4.2 V±0.05 V and the overdischarge detection voltage is 2.4 V±0.1 V.

The switch 37 includes, for example, a charge control switch, a discharge control switch, a charging diode, and a discharging diode. The switch 37 performs switching between coupling and decoupling between the electric power source 31 and external equipment in accordance with an instruction from the controller 36. The switch 37 includes, for example, a metal-oxide-semiconductor field-effect transistor (MOSFET) including a metal-oxide semiconductor. The charging and discharging currents are detected on the basis of an ON-resistance of the switch 37.

The temperature detector 39 includes a temperature detection device such as a thermistor. The temperature detector 39 measures a temperature of the electric power source 31 using the temperature detection terminal 35, and outputs a result of the temperature measurement to the controller 36. The result of the temperature measurement to be obtained by the temperature detector 39 is used, for example, in a case where the controller 36 performs charge/discharge control upon abnormal heat generation or in a case where the controller 36 performs a correction process upon calculating a remaining capacity.

Figure 7:
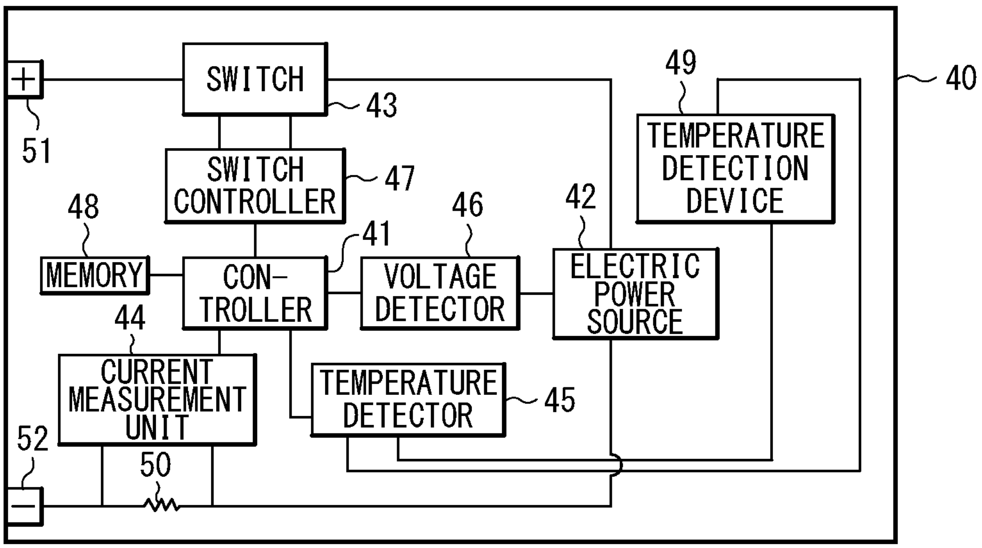
FIG. 7 is a block diagram illustrating a configuration of an application example of the secondary battery, which is a battery pack including an assembled battery according to an embodiment.

FIG. 7 illustrates a block configuration of a battery pack including an assembled battery. In the following description, reference will be made as necessary to the components of the battery pack including the single battery (see FIG. 6).

As illustrated in FIG. 7, the battery pack includes a positive electrode terminal 51 and a negative electrode terminal 52. Specifically, the battery pack includes, inside a housing 40, the following components: a controller 41, an electric power source 42, a switch 43, a current measurement unit 44, a temperature detector 45, a voltage detector 46, a switch controller 47, a memory 48, a temperature detection device 49, and a current detection resistor 50.

The electric power source 42 includes an assembled battery in which two or more secondary batteries are coupled to each other, and a type of the coupling of the two or more secondary batteries is not particularly limited. Accordingly, the coupling scheme may be in series, in parallel, or of a mixed type of both. For example, the electric power source 42 includes six secondary batteries coupled to each other in two parallel and three series.

Respective configurations of the controller 41, the switch 43, the temperature detector 45, and the temperature detection device 49 are similar to respective configurations of the controller 36, the switch 37, and the temperature detector 39 (the temperature detection device). The current measurement unit 44 measures a current using the current detection resistor 50, and outputs a result of the measurement of the current to the controller 41. The voltage detector 46 measures a battery voltage of the electric power source 42 (the secondary battery) and provides the controller 41 with a result of the measurement of the voltage that has been subjected to analog-to-digital conversion.

The switch controller 47 controls an operation of the switch 43 in response to signals supplied by the current measurement unit 44 and the voltage detector 46. If a battery voltage reaches an overcharge detection voltage or an overdischarge detection voltage, the switch controller 47 turns off the switch 43 (the charge control switch). This prevents a charging current from flowing into a current path of the electric power source 42. This enables the electric power source 42 to perform only discharging via the discharging diode, or only charging via the charging diode. In addition, if a large current flows upon charging or discharging, the switch controller 47 blocks the charging current or the discharging current.

The switch controller 47 may be omitted and the controller 41 may thus also serve as the switch controller 47. The overcharge detection voltage and the overdischarge detection voltage are not particularly limited, and are similar to those described above in relation to the battery pack including the single battery.

The memory 48 includes, for example, an electrically erasable programmable read-only memory (EEPROM) which is a non-volatile memory, and the memory 48 stores, for example, a numeric value calculated by the controller 41 and data (e.g., an initial internal resistance, a full charge capacity, and a remaining capacity) of the secondary battery measured in the manufacturing process.

The positive electrode terminal 51 and the negative electrode terminal 52 are terminals coupled to, for example, external equipment that operates using the battery pack, such as a laptop personal computer, or external equipment that is used to charge the battery pack, such as a charger. The electric power source 42 (the secondary battery) is chargeable and dischargeable via the positive electrode terminal 51 and the negative electrode terminal 52.

Figure 8:
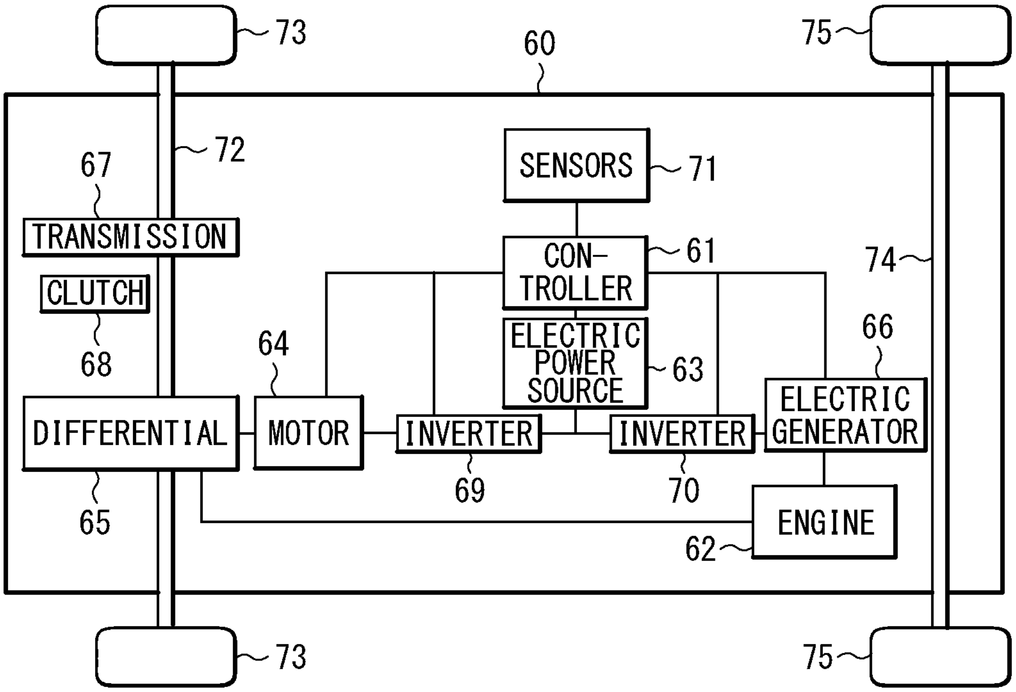
FIG. 8 is a block diagram illustrating a configuration of an application example of the secondary battery, which is an electric vehicle according to an embodiment.

FIG. 8 illustrates a block configuration of a hybrid automobile which is an example of the electric vehicle. As illustrated in FIG. 8, the electric vehicle includes, inside a housing 60, the following components: a controller 61, an engine 62, an electric power source 63, a motor 64, a differential 65, an electric generator 66, a transmission 67, a clutch 68, inverters 69 and 70, and sensors 71. The electric vehicle also includes a front wheel drive shaft 72, a pair of front wheels 73, a rear wheel drive shaft 74, and a pair of rear wheels 75. The front wheel drive shaft 72 and the pair of front wheels 73 are coupled to the differential 65 and the transmission 67.

The electric vehicle is configured to travel by using one of the engine 62 or the motor 64 as a driving source. The engine 62 is a major power source, such as a gasoline engine. In a case where the engine 62 is used as a power source, a driving force (a rotational force) of the engine 62 is transmitted to the front wheels 73 and the rear wheels 75 via the differential 65, the transmission 67, and the clutch 68, which are driving parts. Note that the rotational force of the engine 62 is transmitted to the electric generator 66, and the electric generator 66 thus generates alternating-current power by utilizing the rotational force. In addition, the alternating-current power is converted into direct-current power via the inverter 70, and the direct-current power is thus accumulated in the electric power source 63. In contrast, in a case where the motor 64 which is a converter is used as a power source, electric power (direct-current power) supplied from the electric power source 63 is converted into alternating-current power via the inverter 69. Thus, the motor 64 is driven by utilizing the alternating-current power. A driving force (a rotational force) converted from the electric power by the motor 64 is transmitted to the front wheels 73 and the rear wheels 75 via the differential 65, the transmission 67, and the clutch 68, which are the driving parts.

When the electric vehicle is decelerated by means of a brake mechanism, a resistance force at the time of the deceleration is transmitted as a rotational force to the motor 64. Thus, the motor 64 may generate alternating-current power by utilizing the rotational force. The alternating-current power is converted into direct-current power via the inverter 69, and direct-current regenerative power is thus accumulated in the electric power source 63.

The controller 61 includes, for example, a CPU, and controls an overall operation of the electric vehicle. The electric power source 63 includes one or more secondary batteries and is coupled to an external electric power source. In this case, the electric power source 63 may be supplied with electric power from the external electric power source and thereby accumulate the electric power. The sensors 71 are used to control the number of revolutions of the engine 62 and to control an angle of a throttle valve (a throttle angle). The sensors 71 include one or more of sensors including, without limitation, a speed sensor, an acceleration sensor, and an engine speed sensor.

The case where the electric vehicle is a hybrid automobile has been described as an example; however, the electric vehicle may be a vehicle that operates using only the electric power source 63 and the motor 64 and not using the engine 62, such as an electric automobile.

Although not specifically illustrated here, other application examples are also conceivable as application examples of the secondary battery according to an embodiment.

Specifically, the secondary battery is applicable to an electric power storage system. The electric power storage system includes, inside a building such as a residential house or a commercial building, the following components: a controller, an electric power source including one or more secondary batteries, a smart meter, and a power hub.

The electric power source is coupled to electric equipment such as a refrigerator installed inside the building, and is couplable to an electric vehicle such as a hybrid automobile stopped outside the building. Further, the electric power source is coupled, via the power hub, to a home power generator such as a solar power generator installed at the building, and is also coupled, via the smart meter and the power hub, to a centralized power system of an external power station such as a thermal power station.

Alternatively, the secondary battery is applicable to an electric power tool such as an electric drill or an electric saw. The electric power tool includes, inside a housing to which a movable part such as a drilling part or a saw blade part is attached, the following components: a controller, and an electric power source including one or more secondary batteries.

EXAMPLES

A description is given of Examples of the present technology below according to an embodiment.

Experiment Examples 1 to 25

Positive electrode active materials (large-sized particles 100 and small-sized particles 200) illustrated in FIGS. 1 to 3 were manufactured and secondary batteries (lithium-ion secondary batteries) of the laminated-film type illustrated in FIGS. 4 and 5 were fabricated, following which the secondary batteries were evaluated for their respective battery characteristics as described below.

[Manufacture of Positive Electrode Active Material]

To manufacture the positive electrode active material, the small-sized particles 200 were manufactured by an immersion method.

Specifically, first, 6 g of ammonia water (at concentration of 28 wt %) was added to 25 g of ethanol, following which the ethanol was stirred. The ammonia water was thereby dissolved in the ethanol. As a result, an alkaline solvent was obtained.

Thereafter, 35 g of the center parts 210 (lithium cobalt oxide ($LiCoO_2$) which is a lithium-containing compound, in a powder form having a mean primary particle size of 20 μm) was added to the alkaline solvent. Thereafter, the first metal alkoxide and the second metal alkoxide were added to the alkaline solvent, following which the alkaline solvent was stirred (for a stirring time of 120 minutes) in a room temperature environment (at a temperature of 20° C.). In this case, the third metal alkoxide was further added to the alkaline solvent on an as-needed basis. The respective amounts (the respective contents in weight percent) of the added first metal alkoxide and the added second metal alkoxide were as listed in Table 1. Presence or absence of the third metal alkoxide and the amount (the content in weight percent) of the added third metal alkoxide were as listed in Table 1. The content (wt %) described here represents a rate in weight percent where the weight of the center parts 210 is regarded as 100 wt %. Thus, a preparation solution was prepared.

Here, as the first metal alkoxide, $Si—(OC_2H_5)_4$ (TES), $Ti—(OC_4H_9)_4$ (TBT), $Al—(OCH(CH_3)_2)_3$ (TIPA), and $Zr—(OC_4H_9)_4$ (ZTB) were used. As the second metal alkoxide, $H_{33}C_{16}Si—(OCH_3)_3$ (HDTMS) was used. As the third metal alkoxide, $(H_3CO)_3—Si—C_2H_4—Si—(OCH_3)_3$ (BTESE) and $(H_3CO)_3—Si—C_6H_{12}—Si—(OCH_3)_3$ (BTESH) were used.

Thereafter, the preparation solution was filtered to thereby collect the center parts 210 whose surface the preparation solution was attached to, following which the center parts 210 were washed using a solvent (acetone) for washing.

Thereafter, the center parts 210 were heated (at a heating temperature of 80° C. and for a heating time of 120 minutes) to thereby dry the center parts 210. Thus, the surface of each of the center parts 210 was provided thereon with the followings: the underlayer 221 including the reaction product of the first metal alkoxide and further including the reaction product of the third metal alkoxide on an as-needed basis, and the surface layer 222 including the reaction product of the second metal alkoxide. That is, the covering part 220 (having a thickness of 10 nm) which was an organic-inorganic hybrid film including the underlayer 221 and the surface layer 222 was formed. As a result, the small-sized particles 200 each including the center part 210 and the covering part 220 (the underlayer 221 and the surface layer 222) were manufactured. The small-sized particles 200 had the median diameter D50 (μm) as listed in Table 1.

Lastly, the large-sized particles 100 (lithium cobalt oxide which is a lithium composite oxide in a powder form) and the small-sized particles 200 were mixed with each other. The large-sized particles 100 had the median diameter D50 (μm) as listed in Table 1. In this case, a mixture ratio (a weight ratio) between the large-sized particles 100 and the small-sized particles 200 was set to 80:20.

Thus, the positive electrode active material including the large-sized particles 100 and the small-sized particles 200 was obtained (Experiment examples 1 to 14).

[Fabrication of Secondary Battery]

The secondary batteries were fabricated using the above-described positive electrode active material (the large-sized particles 100 and the small-sized particles 200) in accordance with the following procedure.

(Fabrication of Positive Electrode)

First, 90 parts by mass of the positive electrode active material, 5 parts by mass of the positive electrode binder (polyvinylidene difluoride), and 5 parts by mass of the positive electrode conductor (Ketjen black) were mixed with each other to thereby obtain a positive electrode mixture. Thereafter, the positive electrode mixture was put into an organic solvent (N-methyl-2-pyrrolidone), following which the organic solvent was stirred to thereby prepare a paste positive electrode mixture slurry. Thereafter, the positive electrode mixture slurry was applied on opposite sides of the positive electrode current collector 11A (a band-shaped aluminum foil having a thickness of 15 μm) by means of a coating apparatus, following which the applied positive electrode mixture slurry was dried to thereby form the positive electrode active material layers 11B. Lastly, the positive electrode active material layers 11B were compression-molded by means of a roll pressing machine (at a roll temperature of 130° C., at a linear pressure of 0.7 g/cm, and at a press speed of 10 m/min).

(Fabrication of Negative Electrode)

First, 90 parts by mass of the negative electrode active material (artificial graphite which is a carbon material and had a mean primary particle size of 20 μm) and 10 parts by mass of an N-methyl-2-pyrrolidone solution including polyamic acid (at concentration of 20 wt %) were mixed with each other, following which the N-methyl-2-pyrrolidone solution was stirred to thereby prepare a negative electrode mixture slurry. Thereafter, the negative electrode mixture slurry was applied on opposite sides of the negative electrode current collector 12A (a band-shaped copper foil having a thickness of 15 μm) by means of a bar coater (having a gap of 35 μm), following which the coating film was dried (at a temperature of 80° C.). Lastly, the coating film was compression-molded by means of a roll pressing machine, following which the coating film was heated (for a heating temperature of 700° C. and for a heating time of 3 hours) to thereby form the negative electrode active material layers 12B including polyimide as the negative electrode binder.

(Preparation of Electrolytic Solution)

The electrolyte salt (lithium hexafluorophosphate ($LiPF_6$)) was added to a solvent (ethylene carbonate which is a cyclic carbonic acid ester and ethyl methyl carbonate which is a chain carbonic acid ester), following which the solvent was stirred. In this case, a mixture ratio (a weight ratio) of the solvent was set as follows: ethylene carbonate/ethyl methyl carbonate=50:50. The content of the electrolyte salt with respect to the solvent was set to 1 mol/l (=1 $mol/dm^3$).

(Assembling of Secondary Battery)

First, the positive electrode lead 14 including aluminum was welded to the positive electrode current collector 11A, and the negative electrode lead 15 including copper was welded to the negative electrode current collector 12A. Thereafter, the positive electrode 11 and the negative electrode 12 were stacked on each other with the separator 13 (a fine-porous polyethylene film having a thickness of 25 μm) interposed therebetween, following which the stack of the positive electrode 11, the negative electrode 12, and the separator 13 was wound to thereby fabricate a wound body. Thereafter, the wound body was pressed by means of a pressing machine to thereby shape the wound body to have an elongated sectional shape.

Thereafter, the outer package film 20 was folded in such a manner as to sandwich the wound body placed in the depression part 20U, following which the outer edges of two sides of the outer package film 20 were thermal-fusion-bonded to each other to thereby allow the wound body to be contained inside the pouch-shaped outer package film 20. As the outer package film 20, a moisture-proof aluminum laminated film was used in which a fusion-bonding layer (a polypropylene film having a thickness of 30 μm), a metal layer (an aluminum foil having a thickness of 40 μm), and a surface protective layer (a nylon film having a thickness of 25 μm) were stacked in this order from the inner side.

Lastly, the electrolytic solution was injected into the pouch-shaped outer package film 20 and thereafter, the outer edges of the remaining one side of the outer package film 20 were thermal-fusion-bonded to each other in a reduced-pressure environment. In this case, the sealing film 21 (a polypropylene film having a thickness of 5 μm) was interposed between the outer package film 20 and the positive electrode lead 14, and the sealing film 22 (a polypropylene film having a thickness of 5 μm) was interposed between the outer package film 20 and the negative electrode lead 15. The wound body was thereby impregnated with the electrolytic solution. Thus, the battery device 10 was formed. In this manner, the battery device 10 was sealed in the outer package film 20. As a result, the secondary battery was assembled.

(Stabilization of Secondary Battery)

The secondary battery was charged and discharged for one cycle in an ambient temperature environment (at a temperature of 20° C.). The charging and discharging conditions were similar to those in a case of examining a cyclability characteristic to be described later. A film was thereby formed on a surface of the negative electrode 12, etc., and the secondary battery was therefore brought into a stabilized state. As a result, the secondary battery of the laminated-film type was completed.

[Fabrication of Secondary Battery of Comparative Example]

For comparison, as described in Table 2, positive electrode active materials were manufactured, and secondary batteries were fabricated using the manufactured positive electrode active materials by a similar procedure except for using the following procedures.

First, the center parts 210 were used alone without forming the covering part 220 on the surface of each of the center parts 210 (Experiment example 15).

Second, the median diameter D50 (μm) of the large-sized particles 100 and the median diameter D50 (μm) of the small-sized particles 200 were each changed to an extremely large value or an extremely small value (Experiment examples 16 to 19).

Third, no covering part 220 was formed on the surface of each of the center parts 210 in the process of manufacturing the small-sized particles 200, and the covering part 220 was formed on the surface of each of the large-sized particles 100 in the process of manufacturing the large-sized particles 100 (Experiment example 20). In another case, the covering part 220 was formed on the surface of each of the center parts 210 in the process of manufacturing the small-sized particles 200, and in addition, the covering part 220 was also formed on the surface of each of the large-sized particles 100 in the process of manufacturing the large-sized particles 100 (Experiment example 21). The covering part 220 formed on the surface of each of the large-sized particles 100 had a configuration similar to that of the covering part 220 formed on the surface of each of the center parts 210.

Fourth, the covering part 220 including only the underlayer 221 or only the surface layer 222 was formed (Experiment examples 22 and 23).

Fifth, only the large-sized particles 100 or only the small-sized particles 200 were used (Experiment examples 24 and 25).

[Evaluation of Battery Characteristic]

Evaluation of the secondary batteries for their battery characteristics (a cyclability characteristic and a load characteristic) revealed the results presented in Tables 1 and 2.

(Cyclability Characteristic)

In a case of examining the cyclability characteristic, first, the secondary battery was charged and discharged in an ambient temperature environment (at a temperature of 20° C.) to thereby measure a discharge capacity (a first-cycle discharge capacity). Upon charging, the secondary battery was charged with a constant current of 0.5 A until a voltage reached 4.2 V, following which the secondary battery was charged with a constant voltage of that value of 4.2 V until a current reached a value of 1/10 of the initial value, i.e., until the current reached 0.05 A. Upon discharging, the secondary battery was discharged with a constant current of 0.2 A until a voltage reached 3.0 V.

Thereafter, the secondary battery was repeatedly charged and discharged in a high temperature environment (at a temperature of 45° C.) until the total number of cycles reached 300 to thereby measure the discharge capacity (a 300th-cycle discharge capacity). The charging and discharging conditions were similar to those at the first cycle except for changing the current at the time of discharging to 0.5 C. Note that 0.5 C represents a value of a current corresponding to 0.5 C where the first-cycle discharge capacity was regarded as 1 C, and more specifically, is a value of a current that causes the first-cycle discharge capacity to be completely discharged in 1 hour.

Lastly, the following was calculated: cycle retention rate (%)=(300th-cycle discharge capacity/first-cycle discharge capacity)×100.

(Load Characteristic)

In a case of examining the load characteristic, first, the secondary battery was charged and discharged in an ambient temperature environment (at a temperature of 20° C.) to thereby measure the discharge capacity (a first-cycle discharge capacity). Upon charging, the secondary battery was charged with a constant current of 0.5 A until a voltage reached 4.2 V, following which the secondary battery was charged with a constant voltage of that value of 4.2 V until a current reached a value of 1/10 of the initial value, i.e., until the current reached 0.05 A. Upon discharging, the secondary battery was discharged with a constant current of 0.2 A until a voltage reached 3.0 V.

Thereafter, the secondary battery was charged and discharged again in the same environment to thereby measure the discharge capacity (a second-cycle discharge capacity). The charging and discharging conditions were similar to those at the first cycle except for changing the current at the time of discharging to 0.1 C. Note that 0.1 C represents a value of a current corresponding to 0.1 C where the first-cycle discharge capacity was regarded as 1 C, and more specifically, is a value of a current that causes the first-cycle discharge capacity to be completely discharged in 10 hours.

Thereafter, the secondary battery was further charged and discharged in the same environment to thereby measure the discharge capacity (a third-cycle discharge capacity). The charging and discharging conditions were similar to those at the first cycle except for changing the current at the time of discharging to 2 C. Note that 2 C represents a value of a current corresponding to 2 C where the first-cycle discharge capacity was regarded as 1 C, and more specifically, is a value of a current that causes the first-cycle discharge capacity to be completely discharged in 0.5 hours.

Lastly, the following was calculated: load retention rate (%)=(third-cycle discharge capacity (current at time of discharging=2 C)/second-cycle discharge capacity (current at time of discharging=0.1 C))×100.

(Filling Characteristic of Positive Electrode Active Material)

Here, in addition to examining the cyclability characteristic and the load characteristic described above, to evaluate a filling characteristic of the positive electrode active material, a volume density (g/cc=g/cm$^3$) was measured using the completed positive electrode 11 (positive electrode active material layers 11B). In this case, a dimension such as a thickness (cm) of the positive electrode active material layers 11B was measured by means of a height gauge and a weight of the positive electrode active material layers 11B was also measured, following which the volume density was calculated on the basis of the measured dimension and the measured weight.

TABLE 1

| | Large-sized particles | | Small-sized particles | | | | | | | | | | |
|---|---|---|---|---|---|---|---|---|---|---|---|---|---|
| | | | Center part | Covering part | | | | | | | | | |
| | | | | Underlayer | | | | Surface layer | | | | Cycle | Load |
| Experiment example | Lithium-containing compound | D50 (μm) | Lithium-containing compound | First metal alkoxide | Content (wt %) | Third metal alkoxide | Content (wt %) | Second metal alkoxide | Content (wt %) | D50 (μm) | Volume density (g/cm$^3$) | retention rate (%) | retention rate (%) |
| 1 | $LiCoO_2$ | 15 | $LiCoO_2$ | TES | 0.03 | — | — | HDTMS | 0.17 | 6 | 3.98 | 83 | 80 |
| 2 | | 20 | | | | | | | | 6 | 4.00 | 84 | 78 |
| 3 | | 22 | | | | | | | | 6 | 4.02 | 85 | 77 |
| 4 | | 30 | | | | | | | | 6 | 4.03 | 82 | 76 |
| 5 | | 20 | | | | | | | | 1 | 4.02 | 81 | 80 |
| 6 | | 20 | | | | | | | | 10 | 3.97 | 85 | 77 |
| 7 | $LiCoO_2$ | 20 | $LiCoO_2$ | TES | 0.03 | BTESE | 0.003 | HDTMS | 0.17 | 6 | 3.99 | 84 | 79 |
| 8 | | | | | | | 0.01 | | | | 3.99 | 84 | 80 |
| 9 | | | | | | | 0.05 | | | | 4.00 | 85 | 82 |
| 10 | | | | | | | 0.1 | | | | 3.99 | 85 | 83 |
| 11 | | | | | | BTESH | 0.1 | | | | 4.01 | 85 | 80 |

TABLE 1-continued

| | Large-sized particles | | Small-sized particles: Center part | Small-sized particles: Covering part: Underlayer | | | | Surface layer | | | | Cycle | Load |
|---|---|---|---|---|---|---|---|---|---|---|---|---|---|
| Experiment example | Lithium-containing compound | D50 (μm) | Lithium-containing compound | First metal alkoxide | Content (wt %) | Third metal alkoxide | Content (wt %) | Second metal alkoxide | Content (wt %) | D50 (μm) | Volume density ($g/cm^3$) | retention rate (%) | retention rate (%) |
| 12 | $LiCoO_2$ | 20 | $LiCoO_2$ | TBT | 0.03 | BTESE | 0.1 | HDTMS | 0.17 | 6 | 3.98 | 84 | 81 |
| 13 | | | | TIPA | | | | | | | 3.98 | 85 | 79 |
| 14 | | | | ZTB | | | | | | | 3.97 | 84 | 80 |

TABLE 2

| | Large-sized particles | | Small-sized particles: Center part | Small-sized particles: Covering part: Underlayer | | | | Surface layer | | | | Cycle | Load |
|---|---|---|---|---|---|---|---|---|---|---|---|---|---|
| Experiment example | Lithium-containing compound | D50 (μm) | Lithium-containing compound | First metal alkoxide | Content (wt %) | Third metal alkoxide | Content (wt %) | Second metal alkoxide | Content (wt %) | D50 (μm) | Volume density ($g/cm^3$) | retention rate (%) | retention rate (%) |
| 15 | $LiCoO_2$ | 20 | $LiCoO_2$ | — | — | — | — | — | — | 6 | 3.91 | 76 | 80 |
| 16 | $LiCoO_2$ | 36 | $LiCoO_2$ | TES | 0.03 | — | — | HDTMS | 0.17 | 6 | 3.99 | 74 | 70 |
| 17 | $LiCoO_2$ | 10 | $LiCoO_2$ | TES | 0.03 | — | — | HDTMS | 0.17 | 6 | 3.84 | 69 | 84 |
| 18 | $LiCoO_2$ | 20 | $LiCoO_2$ | TES | 0.03 | — | — | HDTMS | 0.17 | 0.5 | 3.98 | 72 | 84 |
| 19 | $LiCoO_2$ | 20 | $LiCoO_2$ | TES | 0.03 | — | — | HDTMS | 0.17 | 15 | 3.84 | 71 | 72 |
| 20 | $LiCoO_2$ + Covering part | 20 | $LiCoO_2$ | — | — | — | — | — | — | 6 | 3.95 | 80 | 73 |
| 21 | $LiCoO_2$ + Covering part | 20 | $LiCoO_2$ | TES | 0.03 | — | — | HDTMS | 0.17 | 6 | 4.00 | 79 | 71 |
| 22 | $LiCoO_2$ | 20 | $LiCoO_2$ | TES | 0.03 | — | — | — | — | 6 | 3.93 | 75 | 79 |
| 23 | $LiCoO_2$ | 20 | $LiCoO_2$ | — | — | — | — | HDTMS | 0.17 | 6 | 3.92 | 76 | 76 |
| 24 | $LiCoO_2$ | 20 | — | — | — | — | — | — | — | — | 3.87 | 75 | 77 |
| 25 | — | — | $LiCoO_2$ | TES | 0.03 | — | — | HDTMS | 0.17 | 6 | 3.75 | 68 | 87 |

As indicated in Tables 1 and 2, the cyclability characteristic and the load characteristic each varied greatly depending on the configuration of the positive electrode active material. In the following, an evaluation result (the volume density, the cycle retention rate, and the load retention rate) of a case where neither the large-sized particles 100 nor the small-sized particles 200 included the covering part 220 (Experiment example 15) is used as a base of comparison.

Specifically, in a case of satisfying a condition that the large-sized particles 100 included no covering part 220 while only the respective small-sized particles 200 included the covering parts 220 and that the large-sized particles 100 had the median diameter D50 within a range from 15 μm to 30 μm both inclusive while the small-sized particles 200 had the median diameter D50 within a range from 1 μm to 10 μm both inclusive (Experiment examples 1 to 14), the volume density increased stably and the cycle retention rate also increased while the load retention rate was secured at almost the same level, as compared with the base of comparison described above. Thus, due to the increase in the volume density, both the cycle retention rate and the load retention rate increased.

In contrast, in a case of not satisfying the above-described condition (Experiment examples 16 to 25), although the volume density increased in some cases, the cycle retention rate, the load retention rate, or both decreased. Thus, due to the lack of stable increase in the volume density, an increase in both the cycle retention rate and the load retention rate was not achieved.

In a case where the above-described condition was satisfied, the following tendencies were obtained. First, if the underlayer 221 included both the reaction product of the first metal alkoxide and the reaction product of the third metal alkoxide (Experiment examples 10 and 11), both the cycle retention rate and the load retention rate further increased as compared with a case where the underlayer 221 included only the reaction product of the first metal alkoxide (Experiment example 2). Second, in a case where a titanium atom or the like was used as the metal atom in the first metal alkoxide (Experiment examples 12 to 14), both a high cycle retention rate and a high load retention rate were obtained due to an increase in the volume density, as with a case where a silicon atom was used as the metal atom in the first metal alkoxide (Experiment example 10). Third, in a case where a silicon atom was used as the metal atom in the first metal alkoxide (Experiment example 10), the load retention rate further increased as compared with the case where a titanium atom or the like was used as the metal atom (Experiment examples 12 to 14).

Based upon the results presented in Tables 1 and 2, in the case where the positive electrode active material included the large-sized particles 100 (having the median diameter D50 within a range from 15 μm to 30 μm both inclusive) and the small-sized particles 200 (having the median diameter D50 within a range from 1 μm to 10 μm both inclusive) and where the covering part 220 of each of the small-sized particles 200 included the underlayer 221 (the reaction product of the first metal alkoxide) and the surface layer 222 (the reaction product of the second metal alkoxide), the volume density increased and both the high capacity retention rate and the high load retention rate were obtained. Accordingly, a superior cycle characteristic and a superior load characteristic of the secondary battery were obtained.

Although the present technology has been described above with reference to the embodiments and Examples, configurations of the present technology are not limited to those described with reference to the embodiments and Examples above and are modifiable in a variety of ways.

For example, although the description has been given of the case where the secondary battery has a battery structure of the laminated-film type, the battery structure is not particularly limited. Accordingly, the battery structure of the secondary battery may be of any other type, such as the cylindrical type, a prismatic type, a coin type, or a button type.

Further, although the description has been given of the case where the battery device has a device structure of the wound type, the device structure of the battery device is not particularly limited. Accordingly, the device structure of the battery device may be of any other type, such as a stacked type in which the electrodes (the positive electrode and the negative electrode) are stacked, or a zigzag folded type in which the electrodes (the positive electrode and the negative electrode) are each folded in a zigzag manner.

Further, although the description has been given of the case where the electrode reactant is lithium, the electrode reactant is not particularly limited. Specifically, the electrode reactant may be another alkali metal such as sodium or potassium, or may be an alkaline earth metal such as beryllium, magnesium, or calcium, as described above. In addition, the electrode reactant may be another light metal such as aluminum.

Further, although the description has been given of the case where the positive electrode is used in a secondary battery, the use of the positive electrode is not particularly limited. Accordingly, the positive electrode may be used in other electronic devices, including capacitors.

Note that the effects described herein are mere examples, and effects of the present technology are therefore not limited to those described herein. Accordingly, the present technology may achieve any other effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A positive electrode active material for a secondary battery, the positive electrode active material comprising:

first particles having a median diameter D50 of greater than or equal to 15 micrometers and less than or equal to 30 micrometers and each including a lithium-containing compound; and second particles having a median diameter D50 of greater than or equal to 1 micrometer and less than or equal to 10 micrometers and each including a center part that includes a lithium-containing compound and a covering part provided on a surface of the center part, wherein the covering part includes, in order from a side closer to the center part, an underlayer including a reaction product of a first metal alkoxide in which an alkyl group is not bonded to a first metal atom, a surface layer including a reaction product of a second metal alkoxide in which the alkyl group is bonded to a second metal atom, the reaction product of the second metal alkoxide being bonded to the reaction product of the first metal alkoxide, and the first metal atom is same as the second metal atom, wherein the first metal atom and the second metal atom are a titanium atom.

2. The positive electrode active material for a secondary battery according to claim 1, wherein the first metal alkoxide includes a compound represented by Formula (4), and the second metal alkoxide includes a compound represented by Formula (5), $$M11\text{-}OR11_a \qquad (4)$$

where

M11 is the first metal atom,

R11 is an alkyl group having carbon number of greater than or equal to 1 and less than or equal to 10, and a is a value determined in accordance with a valence of M11, $$R12\text{-}M12\text{-}OR13_b \qquad (5)$$

where

M12 is the second metal atom,

R12 is an alkyl group having carbon number of greater than or equal to 8 and less than or equal to 30, R13 is an alkyl group having carbon number of greater than or equal to 1 and less than or equal to 10, and b is a value determined in accordance with a valence of M12.

3. The positive electrode active material for a secondary battery according to claim 1, wherein the lithium-containing compound includes at least one of a compound represented by Formula (1), a compound represented by Formula (2), or a compound represented by Formula (3), $$Li_aNi_{(1-b-c)}Mn_bM1_cO_{(2-d)}X_e \qquad (1)$$

where

M1 is at least one of elements belonging to groups 2 to 15 in a long period periodic table of elements other than Ni and Mn, X is at least one of elements belonging to groups 16 and 17 in the long period periodic table of elements other than O, and a, b, c, d, and e satisfy $0 \le a \le 1.5$, $0 \le b \le 1$, $0 \le c \le 1$, $-0.1 \le d \le 0.2$, and $0 \le e \le 0.2$, $$Li_aCo_{(1-b)}M2_bO_{(2-c)} \qquad (2)$$

where

M2 is at least one of V, Cu, Zr, Zn, Mg, Al, Ga, Y, or Fe, and a, b, and c satisfy $0.9 \le a \le 1.1$, $0 \le b \le 0.3$, and $-0.1 \le c \le 0.1$, $$Li_aNi_bCo_cMn_dM3_{(1-b-c-d)}O_{(2-e)} \qquad (3)$$

where

M3 is at least one of V, Cu, Zr, Zn, Mg, Al, Ga, Y, or Fe, and a, b, c, d, and e satisfy $-0.1 \leq a \leq 0.1$, $0.9 \leq b \leq 1.1$, $0<c<1$, $0<d<1$, $0<e<0.5$, and $0 \leq 1-b-c-d$.

4. The positive electrode active material for a secondary battery according to claim 1, wherein the underlayer further includes a reaction product of a third metal alkoxide in which two metal atoms are bonded to each other via an alkylene group, wherein the two metal atoms are same as the first metal atom and the second metal atom.

5. The positive electrode active material for a secondary battery according to claim 4, wherein the third metal alkoxide includes a compound represented by Formula (6), $$(R15O)_c\text{-}M13\text{-}R14\text{-}M14\text{-}(OR16)_d \quad (6)$$

where

M13 and M14 are the two metal atoms,

R14 is an alkylene group having carbon number of greater than or equal to 1 and less than or equal to 10, R15 and R16 are each an alkyl group having carbon number of greater than or equal to 1 and less than or equal to 10, c is a value determined in accordance with a valence of M13, and d is a value determined in accordance with a valence of M14.

6. A positive electrode for a secondary battery, the positive electrode comprising a positive electrode active material layer including the positive electrode active material for a secondary battery according to claim 1.

7. A secondary battery comprising:

the positive electrode for a secondary battery according to claim 6;

a negative electrode; and an electrolytic solution.

8. The secondary battery according to claim 7, wherein the secondary battery comprises a lithium-ion secondary battery.

* * * * *